Figure 1:
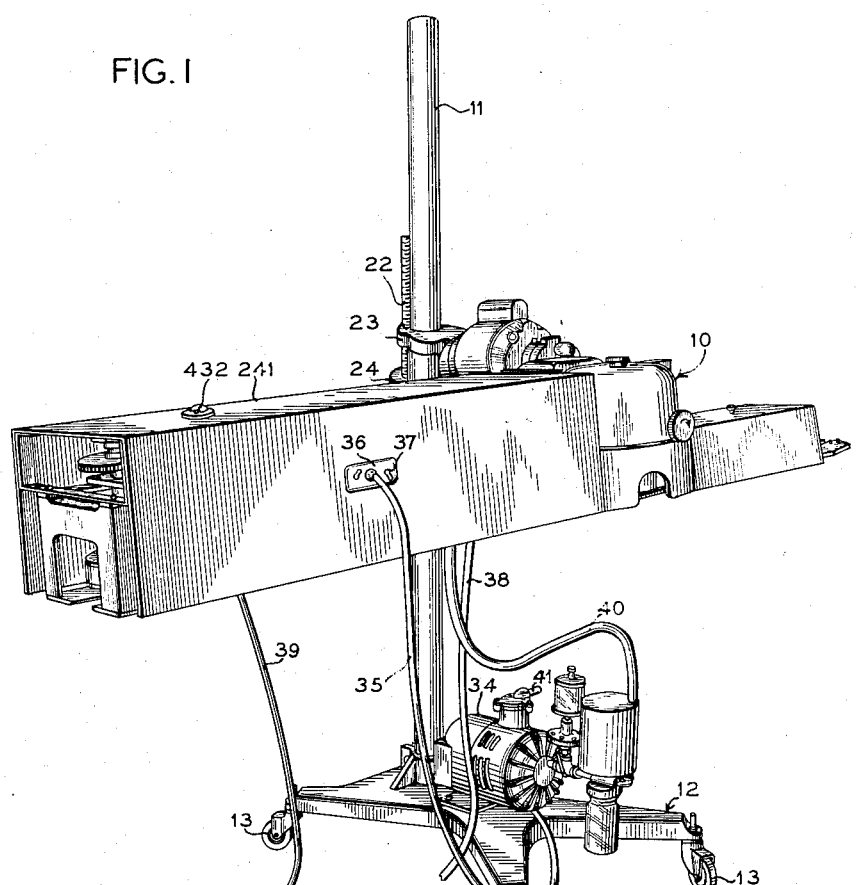

Dec. 20, 1955 J. J. GREVICH 2,727,648
COMBINATION HEAT SEALING AND LABEL APPLYING APPARATUS
Filed July 1, 1953 12 Sheets-Sheet 1

INVENTOR
J.J. GREVICH

BY A. Yates Dowell

ATTORNEY

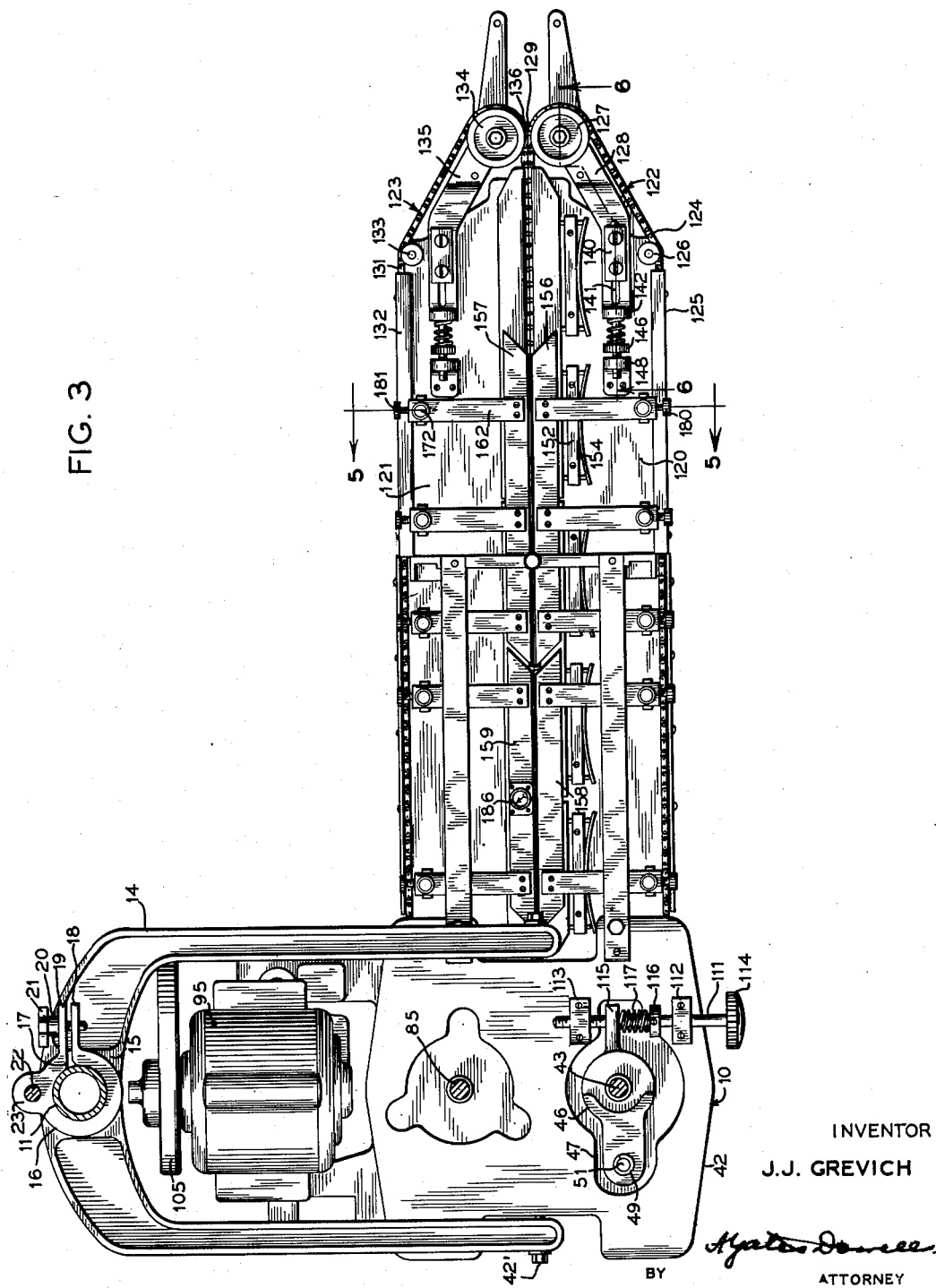

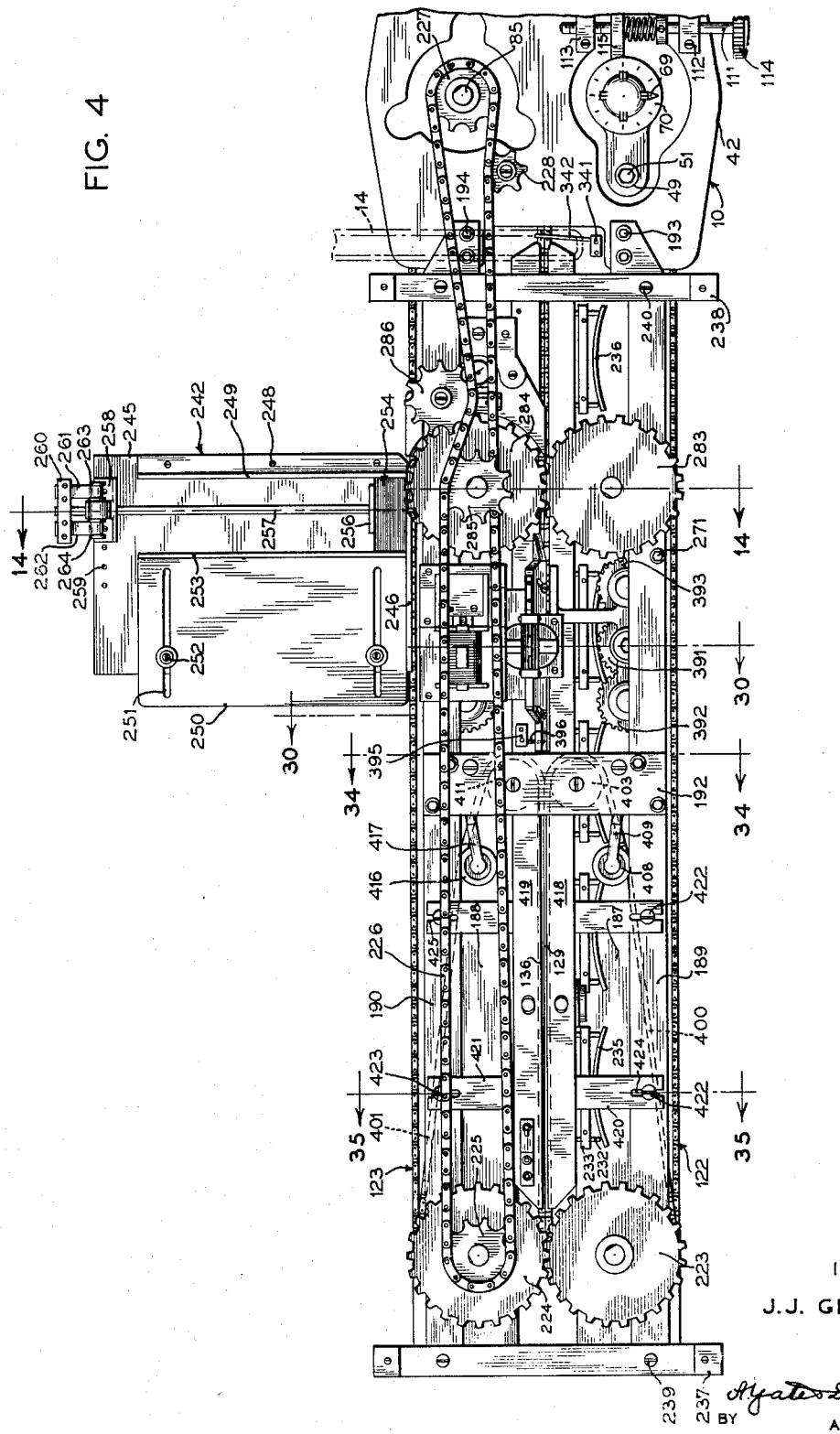

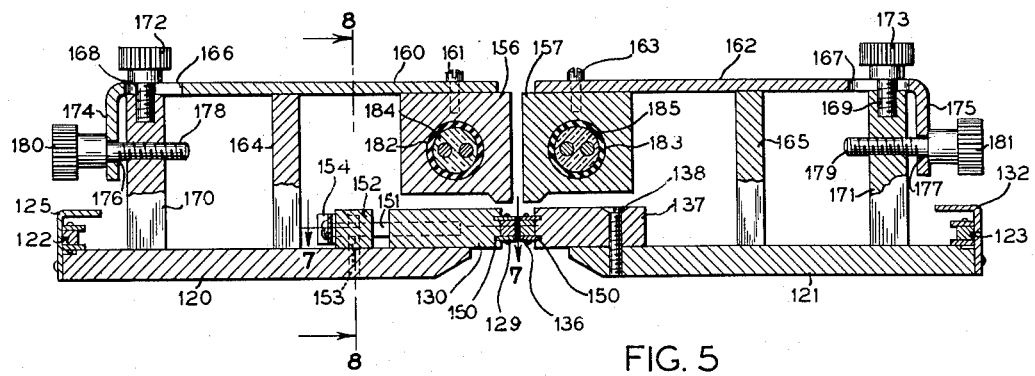

Dec. 20, 1955   J. J. GREVICH   2,727,648
COMBINATION HEAT SEALING AND LABEL APPLYING APPARATUS
Filed July 1, 1953   12 Sheets-Sheet 7

INVENTOR
J. J. GREVICH
BY
ATTORNEY

Dec. 20, 1955  J. J. GREVICH  2,727,648
COMBINATION HEAT SEALING AND LABEL APPLYING APPARATUS
Filed July 1, 1953  12 Sheets-Sheet 8
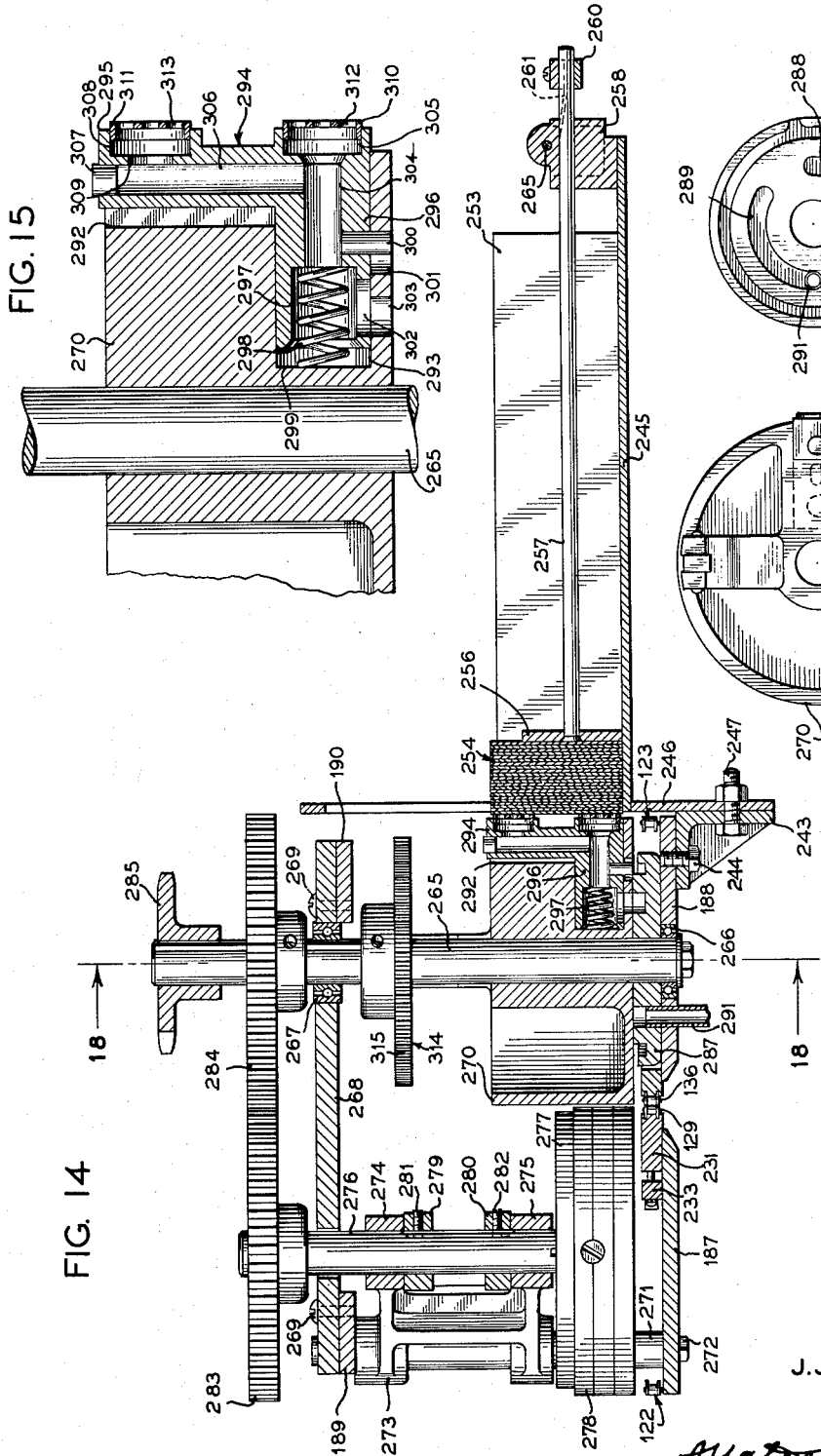
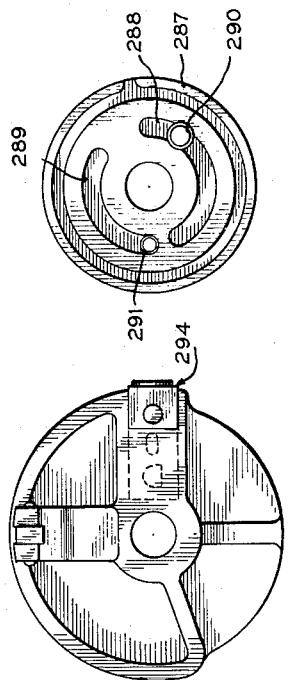
INVENTOR
J.J. GREVICH
BY A. Yates Dowell
ATTORNEY

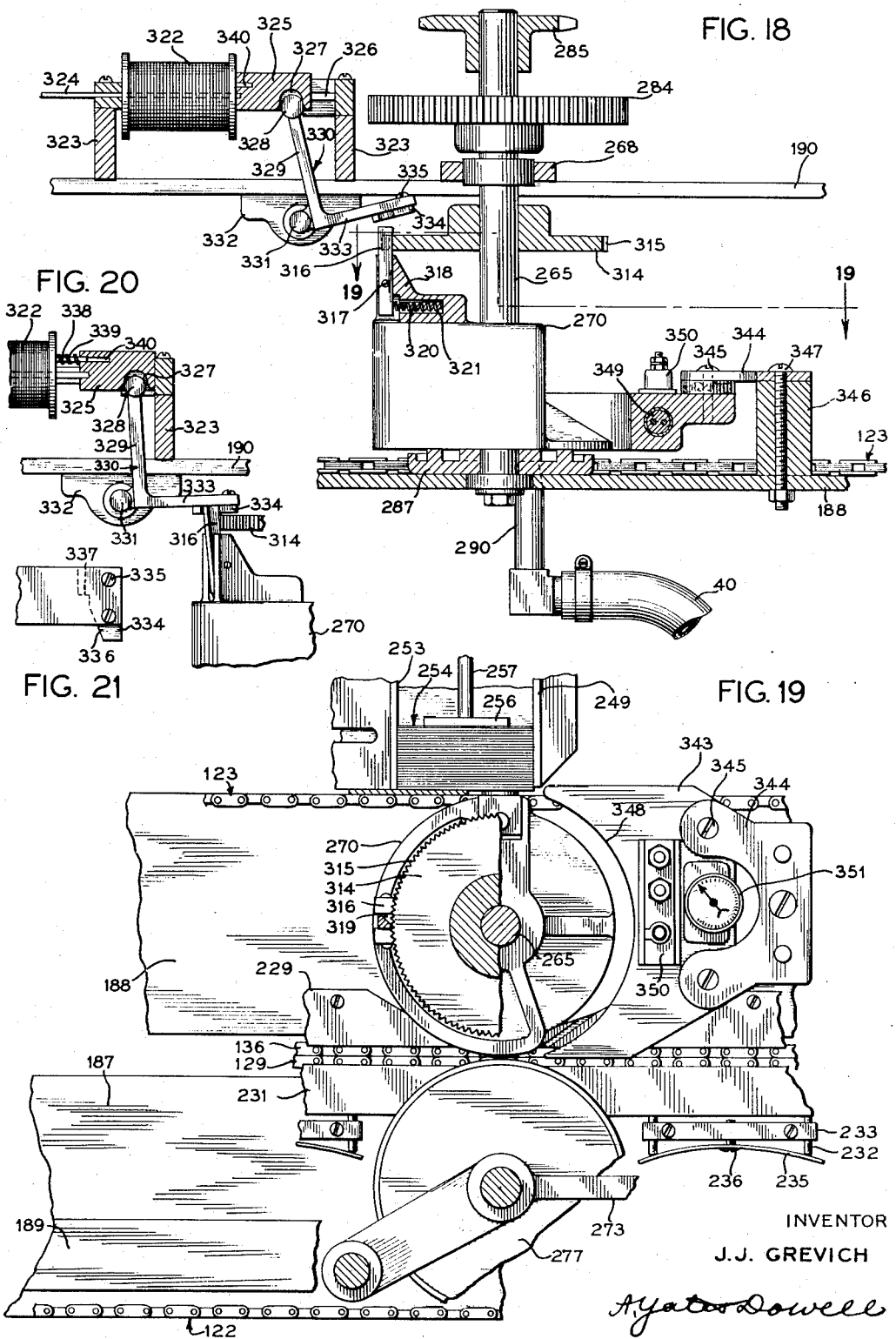

Dec. 20, 1955   J. J. GREVICH   2,727,648
COMBINATION HEAT SEALING AND LABEL APPLYING APPARATUS
Filed July 1, 1953   12 Sheets-Sheet 10

INVENTOR
J. J. GREVICH
BY A. Yates Dowell
ATTORNEY

Dec. 20, 1955  J. J. GREVICH  2,727,648
COMBINATION HEAT SEALING AND LABEL APPLYING APPARATUS
Filed July 1, 1953  12 Sheets-Sheet 11

INVENTOR
J. J. GREVICH

BY  A. Yates Dowell
ATTORNEY

Dec. 20, 1955     J. J. GREVICH     2,727,648
COMBINATION HEAT SEALING AND LABEL APPLYING APPARATUS
Filed July 1, 1953     12 Sheets-Sheet 12
FIG. 34
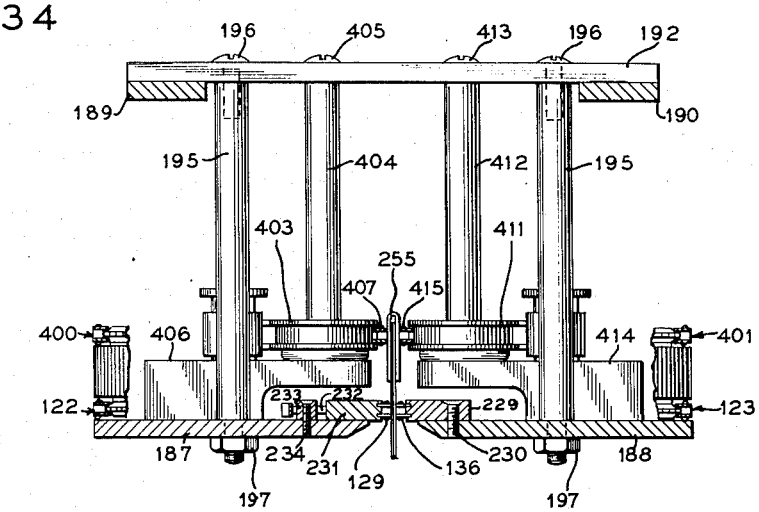
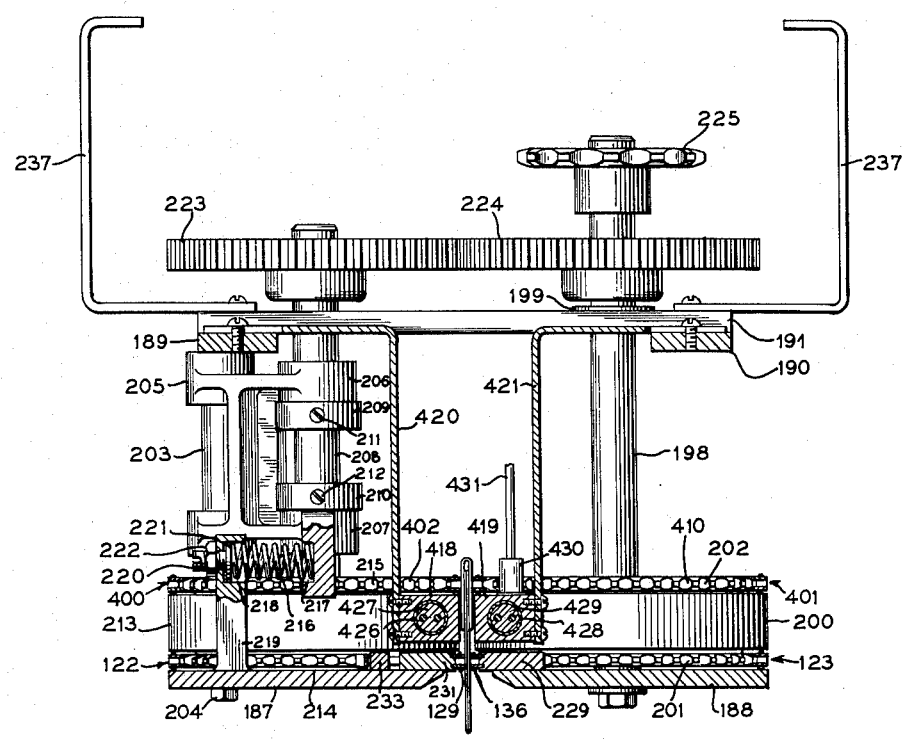
FIG. 35
INVENTOR
J.J. GREVICH
BY
ATTORNEY 2,727,648
        COMBINATION HEAT SEALING AND LABEL
                  APPLYING APPARATUS John J. Grevich, St. Paul, Minn., assignor to Doughboy
  Industries, Inc., New Richmond, Wis., a corporation
  of Wisconsin Application July 1, 1953, Serial No. 365,426

31 Claims. (Cl. 216—55)

This invention relates to thermoplastics and more particularly to an apparatus for sealing the open ends of containers formed of a thermoplastic material and applying a label to the sealed end of such container. The labels may be formed in their entirety of a thermoplastic material or, if desired, may be formed of paper or other suitable material and coated with an appropriate thermoplastic.

Heretofore it has been more or less common practice to seal a thermoplastic container and simultaneously apply a thermoplastic label thereto under the action of heat and pressure. However, this prior art method has presented numerous difficulties since in many cases it is necessary to utilize sealing rolls having a serrated surface which, if these rolls are also utilized to apply the label, result in disfigurement of the same and a consequent unsightly appearance. These prior art machines have also presented difficulties in properly feeding the containers to be sealed and the labels since it is frequently necessary to fold the containers and also to fold the labels. Consequently, folding apparatus must be supplied and since the space limitations are somewhat critical it has been found extremely difficult to locate the feeding and folding mechanism in such a manner as to properly feed the container and labels without resulting in an apparatus which is unnecessarily large and cumbersome. Labels have also heretofore been applied to sealed containers by staples or other mechanical fastening means, but obviously such means presents an unsightly appearance and does not provide a container and label in which the label is as securely attached as when the same is heat sealed directly to the container.

Briefly stated, the apparatus of this invention comprises a heat sealing machine of the rotary type which utilizes heated rolls to seal the openings of containers constructed of thermoplastic material. There is also provided a feeding means for conveying the containers through the sealing rolls and for insuring that there is no relative movement between the containers and such rolls which would tend to result in an improper seal and damaged containers. Since with some types and thicknesses of material, the mere contact between the sealing rolls and the material is not sufficient to produce an efficient seal, preheating means in the form of elongated heated bars is provided which serves to preheat the material prior to contact with the sealing rolls. Automatic temperature control means is provided both for the preheating means and for the sealing rolls.

Immediately following the sealing rolls there is provided a magazine for holding and feeding labels and there is likewise provided means for removing labels one by one from such magazine, heating one side of the label and tacking the same to one side of the sealed portion of the container. Immediately following the tacking operation, there is provided a folding means for folding the label over the sealed end of the container in such a manner as to dispose the label on each side of the sealed portion of such container. From the folding mechanism the label and sealed end of the container pass between heated bars which serves to raise the temperature of the label to the required point for sealing the label to the container. After leaving the heated bars, the label and the container pass between pressure rolls which are unheated and which serve to bring the label into intimate contact with the sealed portion of the container resulting in a strong bond therebetween.

The invention further contemplates complete and efficient one-man operation, automatic control of temperatures, and manual control of speeds in order to properly synchronize the sealing operations with the types of material being utilized. Also, the apparatus is adjustable as to height in order to accommodate different sizes of containers passing therebeneath.

It is accordingly an object of this invention to provide a heat sealing apparatus of the rotary type in which means is provided to feed containers formed of thermoplastic material between sealing rolls and to insure that the speed of travel of the containers is synchronized with the speed of rotation of the sealing rolls.

It is a further object of the invention to provide sealing means combined with label feeding means and in which the operation of the label feeding means is automatically controlled by contact of a control means with the containers passing through the sealing machine.

It is a further object of the invention to provide a combined heat sealing and label applying apparatus in which means is provided for folding the labels prior to final sealing thereof to the containers.

A still further object of the invention is the provision of a combined heat sealing and label applying apparatus in which the label is initially lightly sealed or tacked to one side of the container, folded, and thereafter heated to bring the same to sealing temperature, final sealing being accomplished by the application of pressure only.

Another object of the invention is the provision of a combined heat sealing and label applying apparatus in which means is provided to convey the container and label through sealing means therefor while preventing any relative movement between the label and the container.

A further object of the invention is the provision of a combined heat sealing and label applying apparatus in which folding means for the label is provided, such folding means being adjustable to accommodate labels of different sizes.

It is a further and important object of the invention to provide a sealing and label applying apparatus which is relatively simple and economical to manufacture and which may be operated at a relatively high speed without danger of clogging or breakage and in which the sealing operations are synchronized with the label feeding, folding, and sealing in such a manner as to provide containers with labels firmly secured thereto which present a pleasing appearance.

Figure 2:
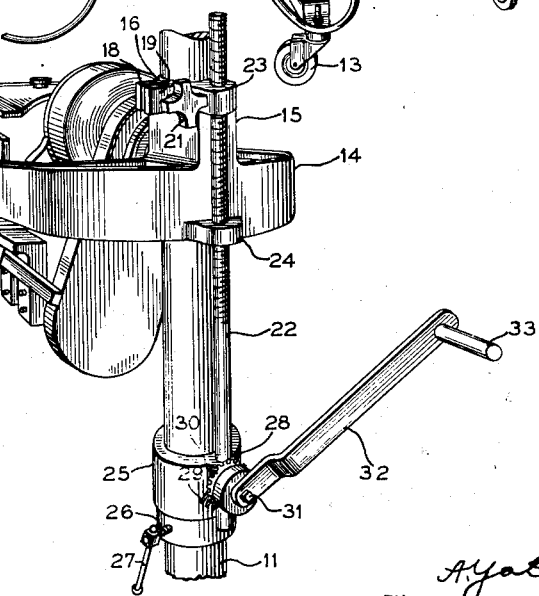
Figure 9:
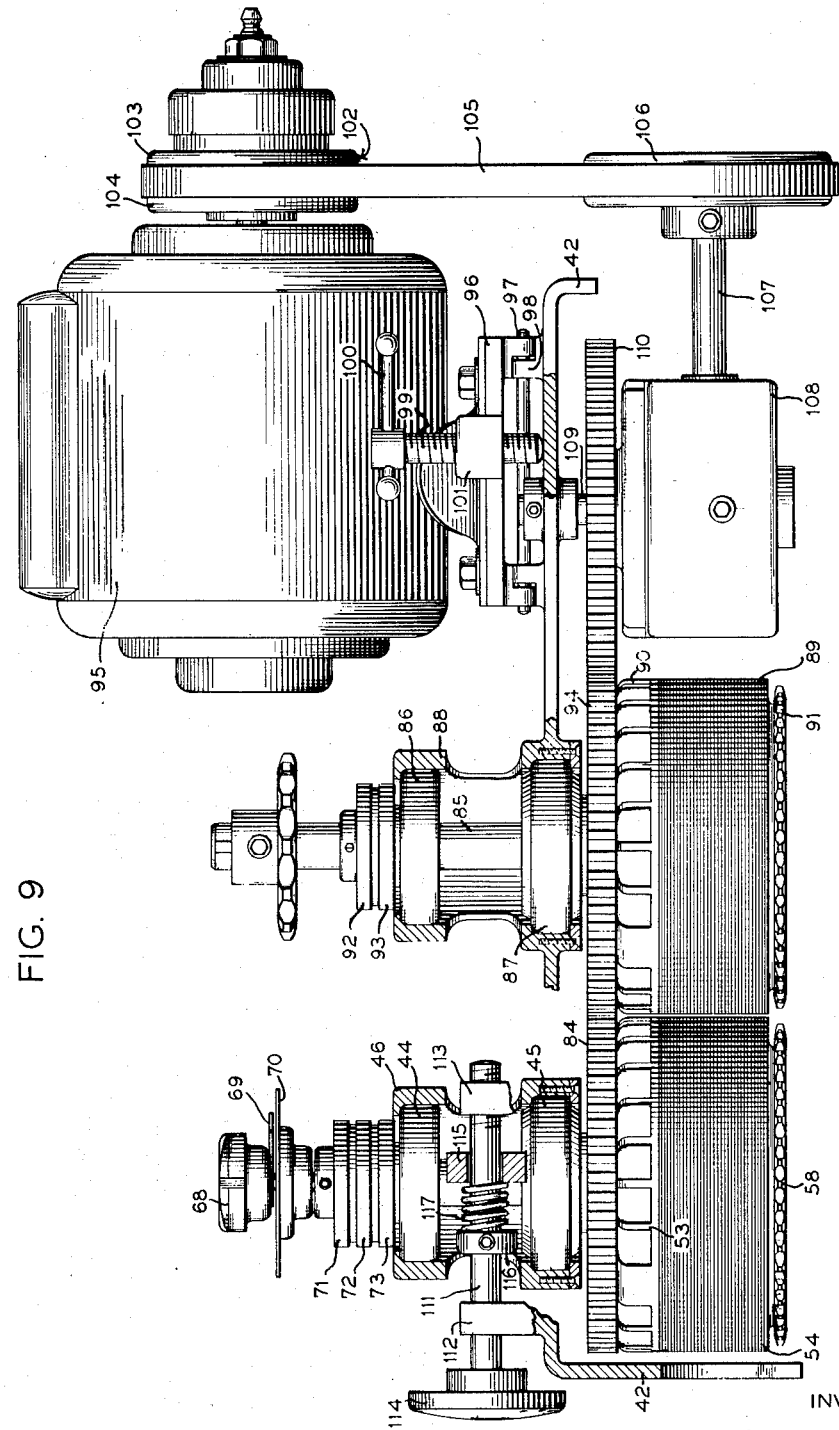
Figure 10:
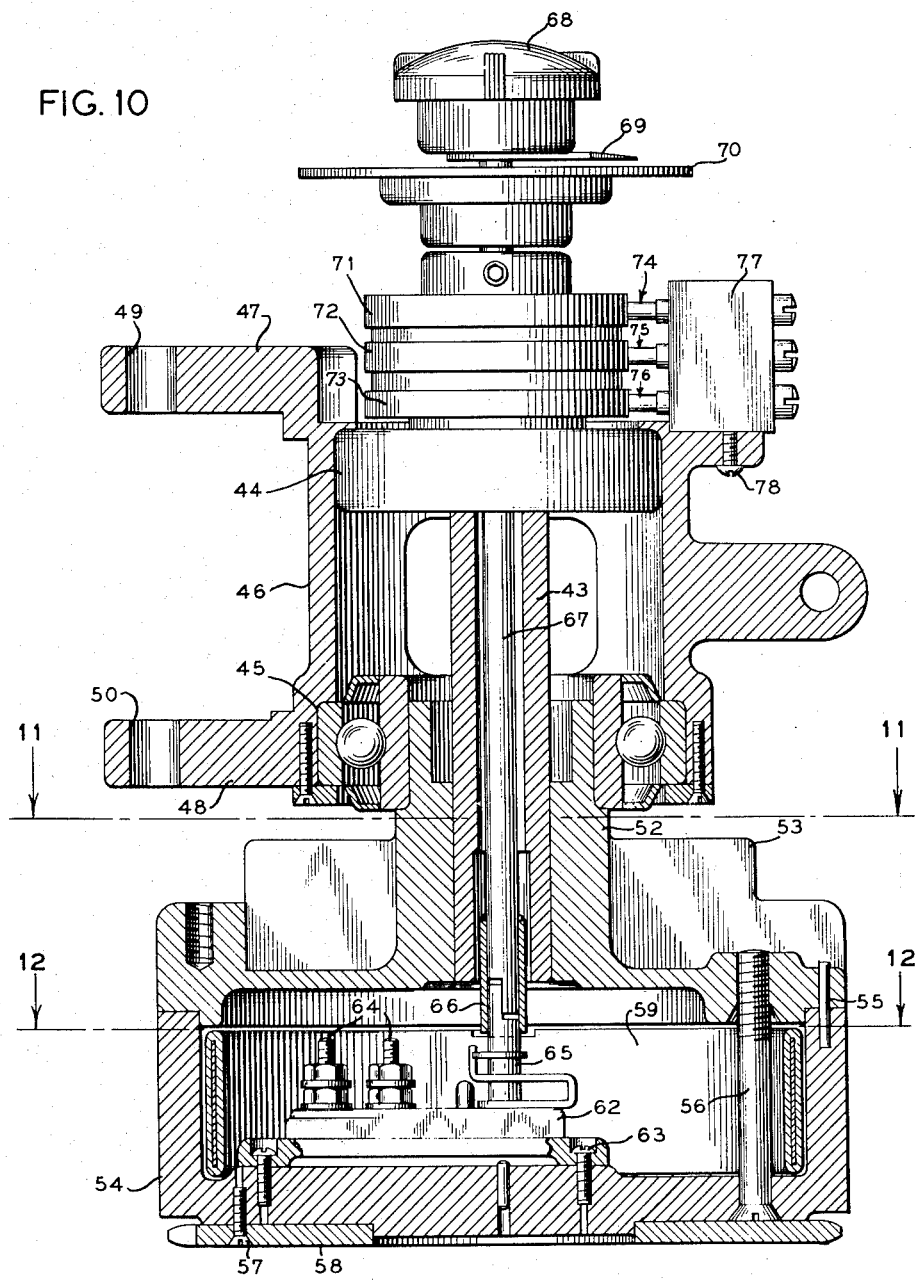
Figure 11:
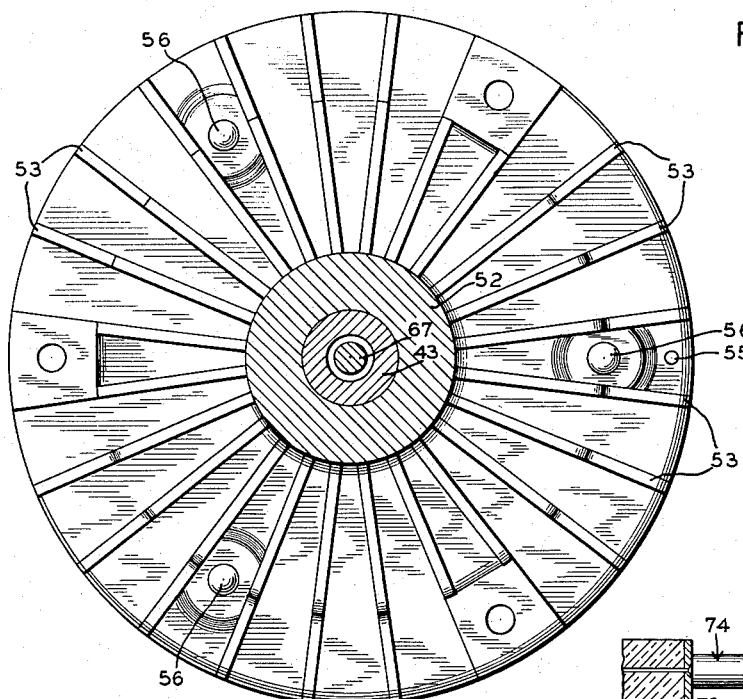
Figure 13:
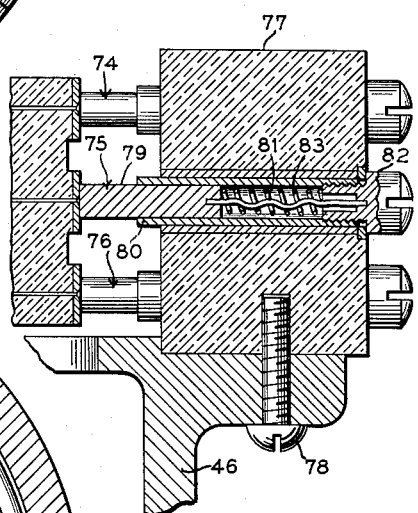
Figure 12:
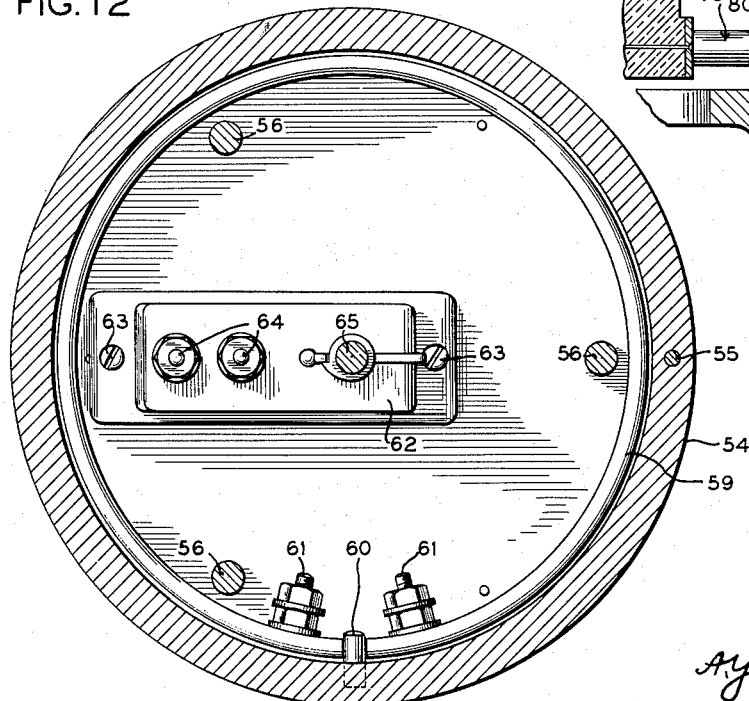
Figure 22:
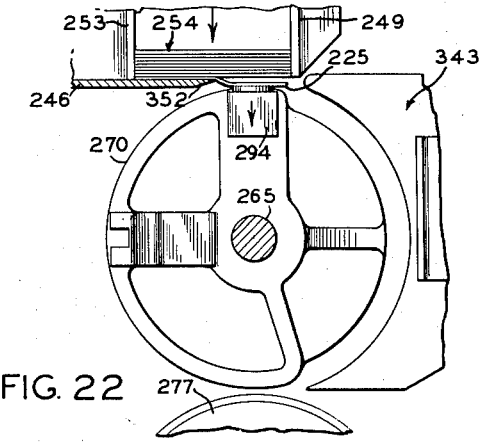
Figure 23:
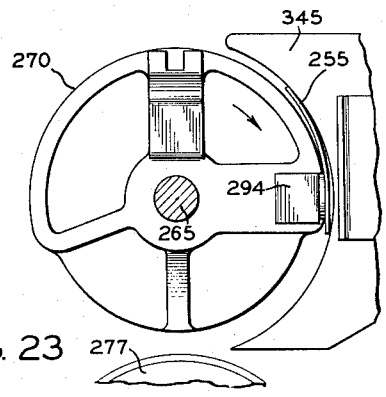
Figure 24:
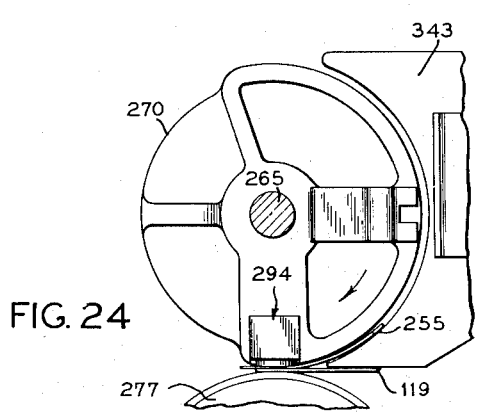
Figure 25:
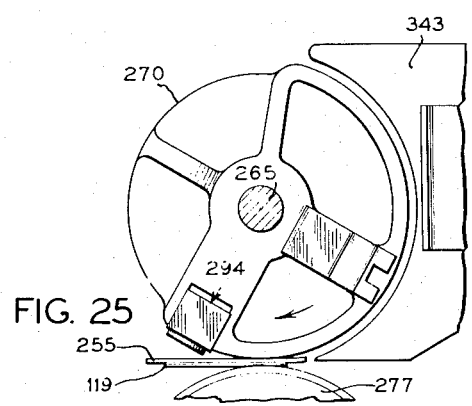
Figures 26, 27:
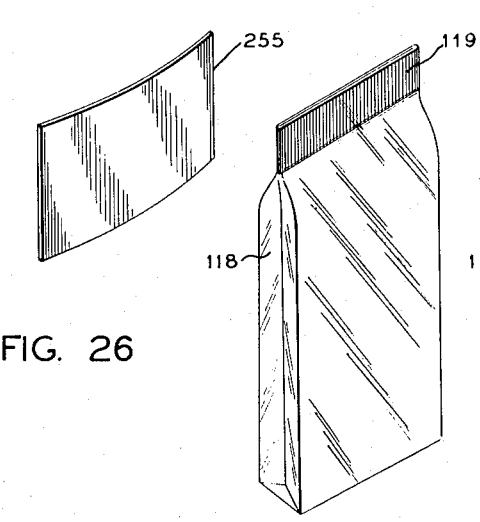
Figures 28, 29:
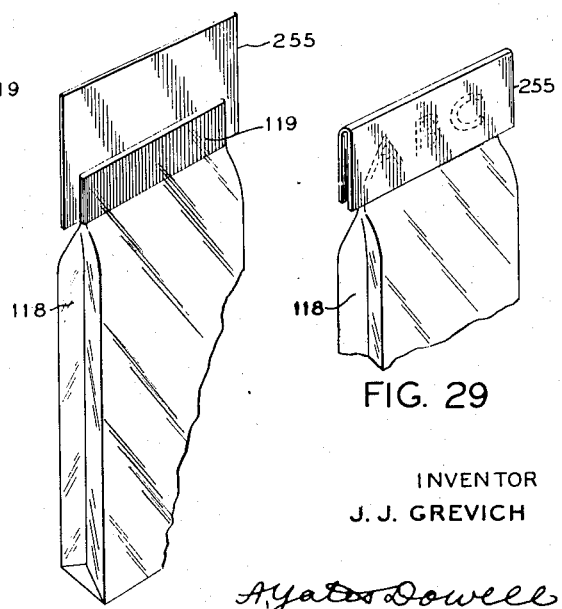
Figures 30, 33:
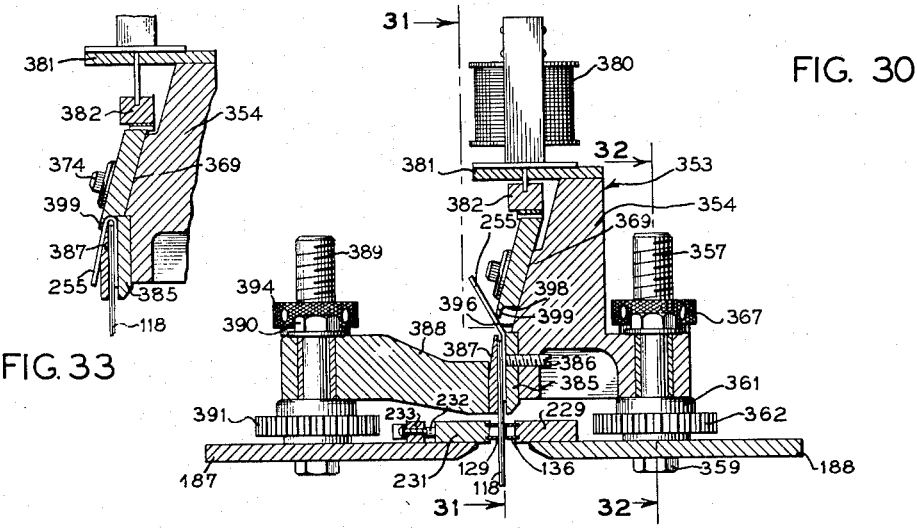
Figure 31:
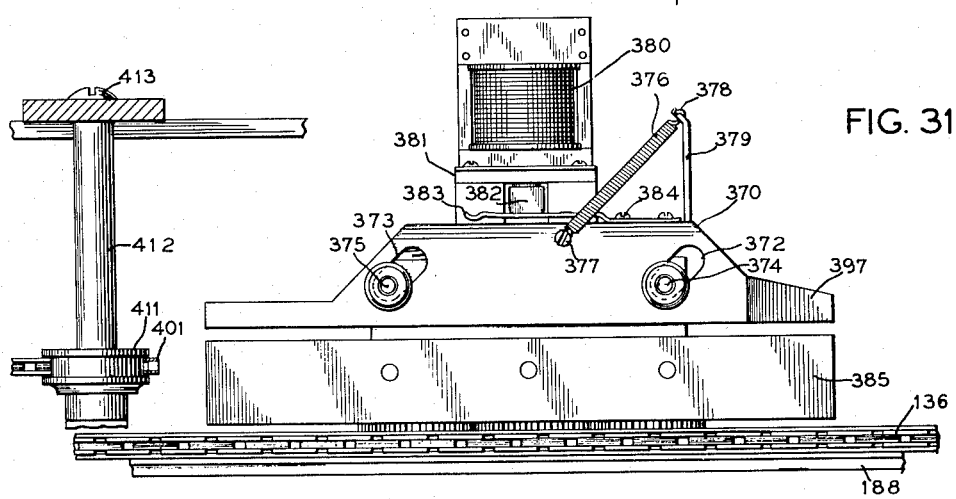
Figure 32:
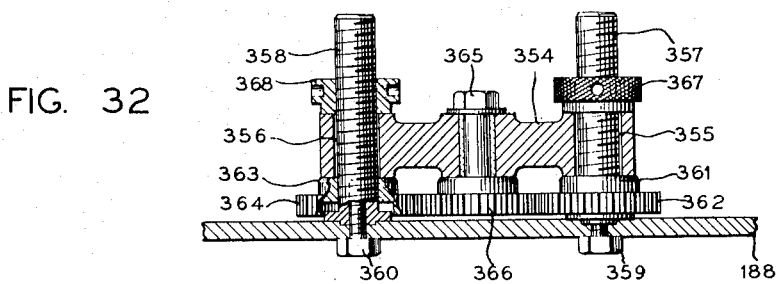

Further objects and advantages of the invention will be apparent from the following description taken in conjunction with the accompanying drawings wherein:

Fig. 1 is a perspective view showing the sealing and label applying apparatus of this invention;

Fig. 2, a fragmentary perspective view showing the mechanism for adjusting the height of the sealing and label applying apparatus;

Fig. 3, a fragmentary top plan view with parts in section for greater clarity and showing the feeding and preheating mechanism for the containers to be sealed in the apparatus of this invention;

Fig. 4, a fragmentary top plan view showing the label feeding, applying, folding, and sealing mechanism of the apparatus of this invention;

Fig. 5, a section view taken on the line 5—5 of Fig. 3 and showing the supporting and adjusting means for the pre-heater bars utilized in pre-heating the containers prior to sealing thereof;

Fig. 6, a sectional view taken on the line 6—6 of Fig. 3 and showing the mechanism for automatically taking up slack in the feed chains;

Fig. 7, a sectional view taken on the line 7—7 of Fig. 5 and showing the pressure bars for maintaining the feed chains in engagement;

Fig. 8, a sectional view taken on the line 8—8 of Fig. 5 and showing particularly the relationship between the pressure bars for the feed chains and the pre-heater bars;

Fig. 9, a fragmentary elevational view with parts in section for greater clarity and showing the mounting of the heat sealing rolls and the drive mechanism therefor;

Fig. 10, a vertical sectional view showing the mounting for one of the sealing rolls together with the heating means therefor and the means for supplying electrical energy to the heating means as well as the mechanism for controlling the temperature of the heating rolls;

Fig. 11, a sectional view taken on the line 11—11 of Fig. 10 and showing the arrangement of heat radiating fins on the upper surface of the sealing roll;

Fig. 12, a sectional view on the line 12—12 of Fig. 10 and showing the internal construction of the sealing roll as well as the disposition of the heating element and thermostat for controlling temperature thereof;

Fig. 13, a fragmentary vertical sectional view showing the mounting for the brushes and slip rings which provide electrical energy to the heating elements disposed in the sealing rolls;

Fig. 14, a fragmentary sectional view taken on the line 14—14 of Fig. 4 and showing the magazine for containing and feeding labels as well as the label applying means;

Fig. 15, a fragmentary sectional view showing the mechanism for removing individual labels from a magazine and for conveying the same to the point of application with the sealed containers;

Fig. 16, a top plan view of the label conveying means;

Fig. 17, a top plan view of the valve plate utilized to control the application of a vacuum to the label conveying mechanism;

Fig. 18, a fragmentary sectional view taken on the line 18—18 of Fig. 14 and showing the one revolution clutch and operating mechanism therefor which serves to actuate the label feeding mechanism;

Fig. 19, a fragmentary sectional view taken on the line 19—19 of Fig. 18 and showing the label feeding, heating and applying mechanism;

Fig. 20, a fragmentary detailed elevational view with parts in section for greater clarity, and showing the position occupied by the one revolution clutch parts when the label feeding mechanism is at rest;

Fig. 21, a fragmentary top plan view showing the cam control means for the one revolution clutch;

Fig. 22, a fragmentary top plan view with parts in section for greater clarity and showing the label conveying roll in the position occupied just prior to removing an individual label from the magazine;

Fig. 23, a view similar to Fig. 22 and showing the label conveying roll in the position occupied during heating of the label;

Fig. 24, a view similar to Fig. 22 and showing the label feeding roller in the position occupied at the time of initial contact between the heated label and the container;

Fig. 25, a view similar to Fig. 22 and showing the position of the label conveying roller immediately after releasing the label therefrom, such label having been applied to the container;

Fig. 26, a view in perspective showing the label to be applied to a container by the apparatus of this invention;

Fig. 27, a view in perspective showing a container sealed in the apparatus of this invention and prior to the application of a label thereto;

Fig. 28, a view similar to Fig. 27 but showing the label applied to one side of the container and prior to folding of such label;

Fig. 29, a view in perspective showing the completely sealed and labeled container;

Fig. 30, a sectional view taken on the line 30—30 of Fig. 4 and showing the folding mechanism for folding the label after the application thereof to one side of the container;

Fig. 31, a fragmentary sectional view taken on the line 31—31 of Fig. 30 and showing the particular relationship of the parts of the folding mechanism prior to operation thereof;

Fig. 32, a fragmentary sectional view taken on the line 32—32 of Fig. 30 and showing the adjusting mechanism for varying the height of the folding apparatus to accommodate labels of different size;

Fig. 33, a fragmentary sectional view showing the position of certain of the parts of the folder upon completion of the folding operation;

Fig. 34, a sectional view taken on the line 34—34 of Fig. 4 and showing the position occupied by the container and label after folding thereof but prior to sealing; and, Fig. 35, a sectional view taken on the line 35—35 of Fig. 4 and showing the position occupied by the container and the label between the label heating bars and prior to passage of said label and container through the pressure rollers.

With continued reference to the drawings, there is shown in Fig. 1 a heat sealing and label applying apparatus constructed in accordance with this invention, this apparatus 10 being adjustably supported on a pedestal or column 11, which in turn is secured to a base 12. Base 12 is supported by casters or other ground engaging means 13 in order to permit convenient movement of the apparatus from place to place.

As best shown in Fig. 2, the sealing and labeling apparatus 10 is supported from the pedestal or column 11 by a yoke 14 which is provided with a sleeve portion 15, slidably received on the column 11. The upper end 16 of the sleeve 15 is split as at 17, and extending ears 18 and 19 are situated at each side of the split 17. A screw threaded clamping means 20 having a finger engaging knob 21 is threadedly received in the ear 18 and rotatably extends through the ear 19 whereby rotation of the clamping screw 20 to draw the ears 18 and 19 toward each other securely locks the sleeve 15 and yoke 14 in place on the column 11.

As best shown in Fig. 2, the sealing and label applying apparatus 10 may be raised or lowered to accommodate packages of different size by a jack screw 22 which is threadedly received in an ear 23 extending from the upper end 16 of sleeve 15 and is rotatably and slidably received in an ear 24 extending from the yoke 14. The lower end of jack screw 22 is rotatably mounted in a collar 25 which is held in adjusted position on column 11 by a set screw 26 provided with hand engaging means 27 for tightening and loosening the same, the set screw 26 engaging the surface of column 11 in order to secure the collar 25 in any desired position thereon. The jack screw 22 is rotatably mounted in an ear 28 extending from the side of collar 25 and axial movement of jack screw 22 in ear 28 is prevented by any desired means. The lower end of jack screw 22 is provided with a bevel gear 29 which meshes with a bevel gear 30 rotatably mounted on a stub shaft 31 secured to the ear 28 extending from collar 25. A crank handle 32 having a hand engaging portion 33 may be removably secured to the bevel gear 30 and upon rotation of the crank handle 32 the jack screw 22 will be rotated in either direction by reason of the engagement between bevel gears 29 and 30.

In order to raise or lower the sealing and label applying apparatus 10 and with the collar 25 locked in position on the column 11 by the set screw 26, it is only necessary to rotate the crank handle 32 in either direction which serves to rotate the jack screw 22 and thus raise or lower the yoke 14 carrying the sealing and label applying apparatus 10. It is of course understood that the clamping screw 20 is loosened during this operation in order to permit free movement of the sleeve 15 on the column 11. When the desired position of the sealing apparatus is reached, the clamping screw 20 may be tightened to bring the ears 18 and 19 toward each other, thus securely locking the yoke 14 in adjusted position upon the column 11.

Should it be desired to move the sealing and label applying apparatus 10 a greater distance than the length of jack screw 22, it is only necessary to move the same the full extent of such jack screw by rotation of the crank handle 32 whereupon the clamping screw 20 is tightened to lock the yoke 14 in position on the column 11 and the set screw 26 is then loosened and the crank handle 32 rotated in the opposite direction to move the collar 25 to a new position on the column 11 at which point the set screw 26 is again tightened, the clamping screw 20 loosened and the crank handle 32 operated to move the yoke 14 and sealing and label applying apparatus 10 carried thereby to the desired position. This operation may of course be repeated as many times as necessary to secure the desired movement of the yoke 14 on the column 11.

Also mounted on the base 12 is an electrically driven vacuum pump 34 which may be conveniently supplied with power through a cable 35 detachably received in a receptacle 36 mounted on the apparatus 10, the operation of the vacuum pump 34 being controlled by a switch 37 forming a part of the receptacle 36. Cables 38 and 39 may serve to supply electrical energy for both the driving of the sealing and label applying apparatus 10 and for supplying electrical energy for the heating means therein which serves to complete the sealing and label applying operation. An air inlet conduit 40 leads from the apparatus 10 to the vacuum pump 34 and an exhaust connection 41 is open to the atmosphere. The operation and purpose of vacuum pump 34 will be later described.

As best shown in Figs. 2 and 3, the arms of yoke 14 extend on each side of a main casting 42 and are secured thereto by screw threaded fastening means or the like 42'. The remaining elements of the apparatus are secured to the main casting 42 and supported therefrom and these elements will be described in logical sequence.

As best shown in Figs. 3, 9, and 10, a front roll shaft 43 is vertically mounted for rotation in upper and lower anti-friction bearings 44 and 45. These bearings in turn are carried by a bracket 46 which is provided with upper and lower spaced parallel ears 47 and 48. These ears are provided with aligned apertures 49 and 50 which are received over an upstanding rod 51 secured to the main casting 42. This provides a pivotal mounting for the front roll shaft 43 and the purpose and operation of such pivotal mounting will be presently described.

As best shown in Fig. 10, a hub 52 is fixed to the lower end of front roll shaft 43 and this hub is provided with heat dissipating fins 53 arranged around the upper surface thereof. Secured to the lower surface of hub 52 is a front sealing roll 54 which may be properly located with respect to the hub 52 by a dowel pin 55, the roll 54 being secured in place by screw threaded fastening means or the like 56. Secured to the lower surface of roll 54 by screw threaded fastening means or the like 57 is a sprocket 58, the purpose of which will presently appear.

Disposed within the roll 54 is a heating element 59 which, as shown in Fig. 12, may be in the form of a premolded circular strip, or may be in the form of a flat strip, curved and inserted within the roll 54. The ends of heating element 59 may be separated by a pin 60 extending from the inner wall of roll 54 and this pin 60 also serves to accurately locate the heating element 59 within such roll. Terminals 61 may be provided on the heating element 59 to receive suitable electrical conductors in order to supply electrical energy thereto.

Also mounted within the roll 54 is a thermostat 62 which may be secured to the lower end of the roll by screw threaded fastening means or the like 63. Thermostat 62 is provided with connecting terminals 64 which may be appropriately connected to the terminals 61 on heating element 59 and a suitable source of electrical energy in order to control the temperature in element 59 and consequently the temperature of front sealing roll 54.

The thermostat 62 may be of the conventional bimetallic type which serves to open and close an electrical circuit upon a predetermined rise or fall in the temperature adjacent thereto and the setting of thermostat 62 may be adjusted by a shaft 65 extended therefrom which is provided with a coupling 66 for engaging a shaft 67 extending upwardly through the interior of front roll shaft 43. Shaft 67 terminates at the upper end thereof in a finger engaging knob 68 and a pointer 69 may also be attached to the shaft 67 in order to indicate the temperature setting of thermostat 62 on an indicator disk 70 secured to the roll shaft 43 and rotatable therewith.

Electrical energy may be supplied to the heating element 59 through the medium of slip rings 71, 72, and 73 secured to the shaft 43 with conductors leading therefrom through the interior of shaft 43 to the thermostat 62 and heating element 59. Slip rings 71, 72, and 73 are engaged respectively by brushes 74, 75 and 76 mounted in an insulating block 77 which in turn is secured to bracket 46 by screw threaded fastening means or the like 78. As best shown in Fig. 13, the brushes 74, 75 and 76 each comprise a slip ring engaging member 79 slidably received within a sleeve 80 which in turn is fixed in the insulating block 77. The ring engaging member 79 may be provided with a pigtail 81 secured to a screw threaded cap 82 which is received within the outer threaded end of sleeve 80 and a compression spring 83 may be disposed between the inner end of cap 82 and the outer end of ring engaging member 79 in order to urge member 79 into firm engagement with the associated slip ring. The pigtail 81 serves to carry the majority of the electrical energy and consequently prevents any loss due to heat dissipation which might be caused by resistance to the flow of electrical current between the sleeve 80 and the slidable member 79. Suitable connections from a source of electrical energy are of course made to the sleeves 80 associated with each of the brushes 74, 75 and 76. Also mounted on the hub 52 and surrounding the upper ends of the fins 53 is a gear 84 the purpose of which will be presently described.

As shown in Fig. 9, a rear roll shaft 85 is rotatably mounted in upper and lower anti-friction bearings 86 and 87 which are carried by a portion 88 of the main casting 42. Secured to the lower end of roll shaft 85 is a rear sealing roll 89 and this roll 89 is also provided with heat dissipating fins 90 and a sprocket 91 similar to the fins and sprocket described above in connection with the front sealing roll 54. The rear sealing roll 89 is provided with a heating element internally thereof similar to that in front sealing roll 54 but no thermostat is included in this roll since the temperature thereof is controlled from the thermostat 62 situated in the front sealing roll 54. The heating element in rear sealing roll 89 is supplied with electrical energy through slip rings 92 and 93 secured to the shaft 85, these slip rings 92 and 93 being engaged by brushes in a manner similar to that described above. A gear 94 is secured about the upper ends of fins 90 and meshes with gear 84 associated with the front sealing roll 54 and these gears serve to provide a driving engagement between the front sealing rolls 54 and 89 respectively. The surface of rolls 54 and 89 may be serrated or may be provided with any other desired configuration depending on the type of material being sealed and the thickness thereof. This configuration may be determined by principles well recognized in the art.

A drive motor 95 may be mounted on a platform 96 which in turn is pivotally supported by a shaft 97 extending through ears 98 on the main casting 42. A jack screw 99 provided with a finger engaging lever 100 may be threadedly received in a boss 101 on the platform 96, the lower end of jack screw 99 engaging the upper surface of main casting 42 whereby upon rotation of the jack screw 99 the motor 95 will be raised or lowered about the pivot shaft 97.

The motor 95 is provided with a power output shaft upon which is mounted an adjustable V-pulley 102, the outer half 103 of this pulley being movable toward or away from the inner half 104 of the pulley in order to increase or decrease the effective diameter thereof. Pulley 102 is engaged by a V-belt 105 which in turn engages a pulley 106 mounted on the power input shaft 107 of a reduction gearing 108. The output shaft 109 of the reduction gearing 108 carries a drive gear 110 which meshes with gear 94 mounted on the rear sealing roll 89 and consequently rotation of the drive gear 110 serves to rotate both the front and rear sealing rolls 54 and 89 respectively. The speed of rotation of these rolls may be varied by moving the portion 103 in or out depending on whether the speed is to be increased or decreased and the consequent change in length of the belt 105 may be compensated for by appropriate adjustment of the jack screw 99 to move the motor 95 toward or away from the pulley 106.

The pressure between the sealing rolls 54 and 89 is adjusted by movement of the front sealing roll 54 and its bracket 46 about the upstanding rod 51 and this is accomplished by an adjusting screw 111 rotatably mounted in a block 112 on the main casting 42 and threadedly received in a block 113 also mounted on the main casting 42. The screw 111 is provided with a finger engaging knob 114 for convenient manipulation thereof. The adjusting screw 111 extends through an aperture in an ear 115 extending from the bracket 46 and disposed between the ear 115 and a collar 116 secured to the screw 111 is a compression spring 117 which serves to urge the bracket 46 and front sealing roll 54 carried thereby toward the rear sealing roll 89. Adjustment of the screw 111 by manipulation of the finger engaging knob 114 serves to increase or decrease the pressure exerted by the spring 117 on the ear 115 and consequently serves to adjust the sealing pressure between the rolls 54 and 89. Sufficient clearance between the gears 84 and 94 is provided in order to accommodate for the movement of the front roll 54. This movement is relatively small and consequently no interruption of drive between the gears 84 and 94 is experienced regardless of the adjustment of front roll 54.

The sealing portion of the apparatus of this invention is designed to be utilized with containers of the type shown at 118 in Fig. 27, these containers being formed of thermoplastic material and being closed and sealed at the open end thereof as shown at 119. If desired, suitable folding means may be incorporated in order to fold the open end of the container and thus present a different type of seam. However, only the single seam without any fold is shown in this application for purposes of illustration only, it being understood that the principles of the invention may be utilized regardless of the type of seam employed.

The feeding and sealing portion of the apparatus is best shown in Figs. 5, 6, 7 and 8 and for this purpose there may be provided front and rear base plates 120 and 121 secured to the main casting 42 and extending to the right thereof as shown in Fig. 3. Base plates 120 and 121 are separated at the center and provide a slot through which the upper portion of the container 118 travels prior to engagement with the sealing rolls 54 and 89. The containers 118 are conveyed to the sealing rolls 54 and 89 by front and rear chains 122 and 123 respectively. Feed chain 122 engages the sprocket 58 on the front sealing roll 54 and feed chain 123 engages the sprocket 91 on the rear sealing roll 89. This engagement serves to drive both of these feed chains in synchronism with the sealing rolls 54 and 89 thus preventing any relative movement between the container 118 and the sealing rolls as the same passes therebetween during the sealing operation.

As best shown in Figs. 3 and 5 the feed chains 122 and 123 extend from the sprockets 58 and 91 slightly above or in engagement with the upper surface of the front and rear bed plates 120 and 121, the outer run 124 of feed chain 122 being covered by a guard 125 secured to the bed plate 120 and being trained around a guide roller 126, also secured to the bed plate 120. At the entrance end of the machine, the feed chain 122 is trained around a pulley 127 mounted on a bracket 128 in a manner to be presently described. The inner run 129 of feed chain 122 engages a pressure bar 130 mounted on the front bed plate 120 in such a manner as to urge the inner run 129 of the feed chain 120 toward the right as viewed in Fig. 5. The structure for accomplishing this purpose will be presently described.

The outer run 131 of the rear feed chain 123 is covered by a guard 132 secured to the rear bed plate 121 and this chain is trained around a guide roller 133 and at the entrance end of the machine around a pulley 134 mounted on a bracket 135 in a manner similar to pulley 127. The inner run 136 of chain 123 engages a backing bar 137 secured to the rear bed plate 121 by screw threaded fastening means or the like 138.

As best shown in Figs. 3 and 6 pulley 127 mounted on bracket 128 serves to maintain tension in the front feed chain 122 and for this purpose the bracket 128 is slidably mounted on the front bed plate 120 by means of screw threaded fastening means or the like 139 extending through a bearing plate 140 and a slot 141 in the bracket 128, the fastening means 139 being secured to the bed plate 120. The bearing plate 140 engages the upper surface of bracket 128 and maintains the same in proper position during sliding movement thereof longitudinally of the apparatus in order to exert a tension on feed chain 122. The inner end of bracket 128 is provided with an upstanding portion 142 having an aperture 143 for slidably receiving a pin 144 about which is disposed a compression spring 145. One end of the compression spring 145 engages the outer surface of upstanding portion 142 and the opposite end of compression spring 145 engages a knurled enlargement 146 on the pin 144, the opposite end 147 of the pin 144 being threaded and threadedly received in an aperture in an angle bracket 148 secured to the bed plate 120 by screw threaded fastening means or the like 149. Manipulation of the pin 144 by means of the knurled enlargement 146 serves to increase or decrease the pressure on compression spring 145 and consequently varies the tension exerted on feed chain 122 by means of the pulley 127. Bracket 135 which carries pulley 134 engaging the rear chain 123 is mounted in a similar manner and may be adjusted in order to properly tension the chain 123.

As will be noted from an inspection of Fig. 5, the feed chains 122 and 123 are formed with the links flat on one side whereby when the chains are in abutting relationship and moving toward the sealing rolls 54 and 89, the flat surface will be presented for engaging the containers 118 being fed into the machine for sealing by the rolls 54 and 89. The opposite sides of the chain links are provided with extending projections 150 which are received in grooves in the backing bars 137 and pressure bars 130 in order to maintain the chains 122 and 123 in proper alignment during feeding of the containers to the sealing rolls 54 and 89. These projections 150 constitute extensions of the side plates of the chains, and by reason of their sliding engagement in the grooves provided in the backing bars 137 and pressure bars 130, prevent sagging of the feed chains 122 and 123 between the sprockets. This effectively maintains proper location and alignment of the containers passing through the apparatus.

As best shown in Figs. 3, 5 and 7, the front feed chain 122 is maintained in engagement with the rear feed chain 123 during feeding movements thereof by means of the pressure bars 130 which are slidably mounted on the upper surface of front bed plate 120 and in order to exert a resilient pressure on the front feed chain 122 a plurality of pins 151 are slidably mounted in pairs in blocks 152 secured to the upper surface of front bed plate 120 by screw threaded fastening means or the like 153. The inner ends of pins 151 are received in apertures in pressure bars 130 and the rear ends of pins 151 are engaged by a leaf spring 154 which is adjustably secured to the block 152 adjacent the center of spring 154 by screw threaded fastening means or the like 155. Adjustment of the screw 155 serves to increase or decrease the pressure exerted on the slidable pins 151 and consequently serves to vary the pressure exerted on the chain 122 which tends to urge the same into engagement with the opposite feed chain 123 or into engagement with containers 118 when the same are positioned therebetween for feeding to the sealing rolls 54 and 89.

With some types of containers 118 it is necessary to preheat the material thereof prior to engagement with the sealing rolls 54 and 89 in order to provide a perfect seal and for this purpose there is provided preheating means in the form of opposed bars 156 and 157 mounted adjacent the entrance end of the machine and a second pair of opposed preheated bars 158 and 159 are mounted adjacent the entrance side of the sealing rolls 54 and 89. With particular reference to Figs. 3 and 5, the preheater bars 156 and 157 are mounted on the bed plates 120 and 121 by means of a bracket 160 secured to the bar 156 by screw threaded fastening means or the like 161 and a bracket 162 secured to the preheater bar 157 by screw threaded fastening means or the like 163. Brackets 160 and 162 are slidably supported substantially at their midpoint by upstanding posts 164 and 165 respectively secured to the bed plates 120 and 121 and adjacent their other ends brackets 160 and 162 are provided with slots 166 and 167 for receiving clamping screws 168 and 169 threadedly received in the upper ends of posts 170 and 171 secured to bedplates 120 and 121. Clamping screws 168 and 169 are provided with finger engaging knobs 172 and 173 in order to permit convenient manipulation thereof. The outer ends of brackets 160 and 162 are provided with downturned portions 174 and 175 having apertures 176 and 177 for rotatably receiving adjusting screws 178 and 179 threadedly received in the posts 170 and 171 respectively. Adjusting screws 178 and 179 are also provided with finger engaging knobs 180 and 181 in order to permit convenient manipulation thereof.

In operation, the preheater bars 156 and 157 are adjusted toward and from each other in order to accommodate containers 118 of different thickness by loosening the clamping screws 172 and 173 and if the bars 156 and 157 are to be moved toward each other, the adjusting screws 178 and 179 are rotated to force the bars 156 and 157 together with the brackets 160 and 162 inwardly to the desired position whereupon the clamping screws 172 and 173 are tightened to firmly retain the bars 156 and 157 in adjusted position. If it is desired to retract the bars 156 and 157, it is only necessary to loosen the clamping screws 172 and 173 and to back off the adjusting screws 178 and 179 whereupon the bars 156 and 157 together with the brackets 160 and 162 may be manually moved apart and then clamped in adjusted position by tightening the clamping screws 172 and 173.

It will be seen that by the above described structure there has been provided a convenient and efficient means for adjustably and firmly supporting the preheater bars 156 and 157 in any desired position of adjustment relative to each other and to the feed chains 122 and 123 and further since the preheater bars 158 and 159 are adjustably mounted in the same manner, it is not considered necessary to describe in detail the mounting means for these latter bars since the description of the mounting means for bars 156 and 157 will suffice for these bars as well. Preheater bars 156 and 157 are provided with longitudinal bores 182 and 183 which serve to receive heating elements 184 and 185 which may be supplied with electrical energy in a well known manner and likewise the supply of electrical energy to these heating elements 184 and 185 as well as similar heating elements incorporated in preheater bars 158 and 159 may be thermostatically controlled in order to maintain the desired temperature. The temperature of the preheater bars may be indicated by a thermometer 186 secured to the bar 159. Since all the bars, 156, 157, 158 and 159 are supplied with electrical energy from a common source which is normally controlled from a single thermostat, one thermometer 186 is all that is necessary to indicate the temperature of all of the bars since such temperature will vary but little from one bar to another and it is only necessary to maintain the same in accordance with the reading on the single thermometer.

The above described mechanism constitutes the sealing portion of the invention and it will be seen that there has been provided a convenient means for feeding containers to be sealed through rotating sealing rolls in such a manner that no relative movement between the containers and the rolls will be possible resulting in a properly sealed container and likewise there is no slippage between the rolls and the container which would result in damage thereto and consequently disfigurement. It will also be seen that adjustments have been provided to accommodate different sizes and thicknesses of containers and the pressure between the sealing rolls may be conveniently varied in order to accommodate such containers. Likewise the heat applied both in the preheater bars and in the sealing rolls may be thermostatically controlled and may be adjusted in accordance with the particular type of materials being sealed.

Furthermore, if desired, folding means may be provided on the apparatus prior to the preheater bars in order to fold the open end of the container prior to sealing thereof. Such folding means is conventional in every respect and has not been shown on the drawing since it would only confuse the showing without accomplishing any useful purpose. Also, as described above, means is provided for varying the speed of rotation of the sealing rolls and the feeding chains and this speed variation permits the sealing of a wide range and thickness of materials. The sealing rolls have been provided with heat dissipating fins in order to prevent overheating of the supporting bearings and this feature materially contributes to the overall life of the apparatus. The label feeding, folding, and applying portion of the apparatus of this invention will now be described in detail.

Extending from the left side of main casting 42 as viewed in Fig. 4 and secured thereto by suitable fastening means are front and rear bed plates 187 and 188 respectively. These plates are spaced apart a sufficient distance to provide a centrally located slot through which sealed containers delivered from the sealing rolls 54 and 89 may pass. Located above front and rear bed plates 187 and 188 is a framework composed of side bars 189 and 190, these side bars being connected by cross bars 191 and 192 and being secured to the main casting 42 by screw threaded fastening means or the like 193 and 194. Side bars 189 and 190 and cross bars 191 and 192 are supported from the front and rear bed plates 187 and 188 by posts 195 secured to the cross bars 191 and 192 by screw threaded fastening means or the like 196 and secured to the front and rear bed plates 187 and 188 by nuts or other suitable means 197.

Adjacent the outer end of rear bed plate 188 a vertical shaft 198 is journalled in a bearing 199 carried by the cross bar 191 and in a bearing not shown carried by the rear bed plate 188. Vertical shaft 198 serves to support a rear label sealing roll 200 having a smooth outer surface and this roll is provided at the lower end thereof with a sprocket 201 for receiving rear feed chain 123. Sealing roll 200 is also provided on the upper surface thereof with a sprocket 202, the purpose of which will be later described.

Adjacent the outer end of front bed plate 187 a vertical rod 203 is secured to the bed plate 187 by suitable fastening means or the like 204, rod 203 also being secured at its upper end to side bar 189. Rod 203 serves to pivotally support a bracket 205 having arms terminating in upper and lower bearing bosses 206 and 207. A vertical shaft 208 is rotatably received in bearing bosses 206 and 207 and vertical movement of shaft 208 is prevented by collars 209 and 210 secured on the shaft 208 by set screws or the like 211 and 212, collars 209 and 210 engaging the inner surfaces of bearing bosses 206 and 207 as best shown in Fig. 35. Shaft 208 serves to support at its lower end a label sealing roll 213 having a smooth outer surface which cooperates with rear label sealing roll 200 in a manner to be later described. Front sealing roll 213 is provided on its lower surface with a sprocket 214 which is engaged by front feed chain 122. Front sealing roll 213 is also provided on its upper surface with a sprocket 215, the purpose of which will be later described.

It will therefore be seen that bracket 205 serves to pivotally support the front sealing roll 213 and permit movement thereof toward and from the rear sealing roll 200. Sealing roll 213 is biased toward the rear sealing roll 200 by a compression spring 216 engaging in a recess 217 in the bracket 205 the opposite end of compression spring 216 being received in a recess 218 adjacent the upper end of a block 219 secured to the front bed plate 187 by welding or other suitable means. The pressure exerted by compression spring 216 may be adjusted by a screw 220 threadedly received in the block 219 and projecting into the recess 218 in engagement with a washer 221 which abuts the end of compression spring 216. Adjusting screw 220 is locked in adjusted position by a lock nut 222 threadedly received thereon and engaging the outer surface of block 219. Appropriate adjustment of the screw 220 will urge the front label sealing roll 213 into engagement with the label to be sealed on the container, such sealing being accomplished by the front sealing roll 213 and the rear sealing roll 200. These sealing rolls are not provided with heating means as was the case with front and rear container sealing rolls 54 and 89 but the label is heated by means to be presently described and the final sealing action is accomplished by pressure only by front and rear label sealing rolls 213 and 200.

The upper end of shaft 208 is provided with a spur gear 223 which meshes with a spur gear 224 fixed to the shaft 198 which supports rear label sealing roll 200. This gear drive insures that the front and rear label sealing rolls 213 and 200 rotate in synchronism and shaft 198 is driven by a sprocket 225 secured to the upper end thereof, sprocket 225 being engaged by a drive chain 226 which also engages a sprocket 227 mounted on the upper end of rear container sealing roll shaft 85. Chain 226 is maintained in tight driving engagement with the sprocket 227 by an idler sprocket 228 mounted on the main casting 42.

The inner run 136 of rear feed chain 123 is engaged by a backing bar 229 secured to the rear bed plate 188 by screw threaded fastening means or the like 230 and the inner run 129 of front feed chain 122 is resiliently urged toward the inner run 136 of rear feed chain 123 by a pressure bar 231. Bar 231 is urged toward backing bar 229 by pins 232 slidably mounted in blocks 233 secured to the front bed plate 187 by screw threaded means or the like 234, pins 232 being engaged by a leaf spring 235 adjustably secured to the block 233 by screw threaded fastening means or the like 236. Adjustment of fastening means 236 will increase or decrease the pressure exerted on pressure bar 231 and consequently the pressure exerted by front and rear feed chains 122 and 123 on the container and label being conveyed thereby. From the above, it will be apparent that front and rear feed chains 122 and 123 travel in synchronism with the front and rear container seal-rolls 54 and 89 and also in synchronism with the front and rear label sealing rolls 213 and 200. Consequently, any slippage between the chains 122 and 123 and the container 118 at any point in the travel thereof is prevented.

Brackets 237 and 238 are secured to the upper surface of side bars 189 and 190 by screws threaded fastening means or the like 239 and 240 and brackets 237 and 238 serve to support and secure in place a housing 241 as shown in Fig. 1 which covers and protects the label feeding, folding and applying portions of the apparatus.

As best shown in Figs. 4 and 14, a label feeding magazine 242 is supported from the rear bed plate 188 by a bracket 243 which is secured to the bed plate 188 by screw threaded fastening means or the like 244. Magazine 242 comprises a bottom plate 245 which is secured to a plate 246 extending substantially at right angles thereto and forming an inner end wall. Plate 246 is secured to bracket 243 by screw threaded fastening means or the like 247. Secured to the upper surface of plate 245 by suitable fastening means or the like 248 is an upstanding side wall 249 and slidably mounted on the upper surface of plate 245 is a plate 250 provided with slots 251 for receiving screw threaded fastening means or the like 252 which serve to adjustably secure plate 250 on bottom plate 245. One edge of plate 250 extends upwardly at an angle thereto as shown at 253 and this provides a side wall opposed to side wall 249. Side walls 253 and 249 provide an adjustable space to receive a stack of labels 254 composed of individual labels 255, the stack 254 being normally positioned against the inner surface of end wall 246 as shown in Figs. 4 and 14.

The stack of labels 254 is normally urged into engagement with the end wall 246 by a follower 256 secured to a rod 257 which in turn is slidably received in a block 258 mounted on the upper surface of bottom plate 245. The block 258 may be secured to the bottom plate 245 by suitable fastening means engaging in the apertures 259 in plate 245 and it will be noted from an inspection of Fig. 4 that a plurality of such apertures 259 are provided in order to permit positioning of the block 258 and follower 246 carried thereby at various positions in accordance with the size of the labels constituting the stack 254. A cross head 260 is secured to the outer end of rod 257 and tapes 261 and 262 are secured to the cross head 260 at each side of the rod 257. Tapes 261 and 262 are received over winding drums 263 and 264 journalled on a shaft 265 secured to the block 258. Spring means (not shown) is provided for rotating the winding drums 263 and 264 in a direction to move the rod 257 carrying follower 256 inwardly toward the stack of labels 254 in order to urge the same against the inner surface of end wall 246. This structure provides a constant feed for the labels 255 constituting the stack 254 and when it is necessary to renew such stack, it is only necessary to remove the rod 257 and follower 256 outwardly against the action of the springs tending to rotate the winding drums 263 and 264 and place the stack between side walls 249 and 253 and release the follower 256 and rod 257 which will then engage the renewed stack 254 and move the same against the end wall 246.

A vertical shaft 265 is journalled in a bearing 266 carried by the rear plate 188 and an upper bearing 267 carried by a cross bar 268 secured to side bars 189 and 190 by screw threaded fastening means or the like 269. Mounted for free rotation on shaft 265 is a label feeding drum 270, the structure and operation of which will be presently described.

A vertical rod 271 is secured to front bed plate 187 by screw threaded fastening means or the like 272 and rod 271 extends upwardly through an aperture in the side bar 189. Rod 271 serves to pivotally mount a bracket 273 having arms terminating in upper and lower bearing bosses 274 and 275 which rotatably receive a vertical shaft 276. Mounted on the lower end of shaft 276 is a pressure roll 277 provided with a surface 278 of suitable non-metallic material, roll 277 being urged toward label feeding drum 270 by resilient means (not shown) but similar to that described in connection with the operation of the bracket 205 which supports the rear label sealing roll 213. Vertical movement of shaft 276 and roll 277 carried thereby is prevented by upper and lower collars 279 and 280 secured in place on the shaft 276 by suitable set screws 281 and 282 with the outer surfaces of the collars 279 and 280 engaging the inner surfaces of bearing bosses 274 and 275. Secured to the upper end of shaft 276 is a spur gear 283 which meshes with a second spur gear 284 secured to the shaft 265. The meshing engagement of gears 283 and 284 causes the label feeding drum 270 and the pressure roller 277 to rotate in synchronism and the shaft 265 is driven by a sprocket 285 mounted on the upper end thereof, sprocket 285 engaging drive chain 226 which is maintained in engagement therewith by an idler sprocket 286 rotatably mounted on the side bar 190.

Supported upon the rear bed plate 188 between the label feeding drum 270 and the upper surface of such rear bed plate 188 is a valve plate 287 which is provided in the upper surface thereof with spaced arcuate grooves 288 and 289 respectively. A vacuum connection 290 connects to conduit 40 and communicates with the arcuate groove 288. A connection 291 which is open to the atmosphere communicates with arcuate groove 289. The upper surface of valve plate 287 and the lower surface of label feeding drum 270 are preferably ground and engage each other in fluid type relationship as shown in Fig. 14.

As best shown in Figs. 14, 15 and 16, the label feeding drum 270 is provided with a recess 292 in the peripheral surface thereof and adjacent the lower end of recess 292, a radial bore 293 extends inwardly of the drum 270, a substantial distance. Recess 292 and bore 293 serve to receive an L-shaped plunger 294 which is provided with an upstanding substantially rectangular portion 295 slidably received in the recess 292 and an inwardly extending cylindrical portion 296 slidably received in a bore 293. A recess 297 is provided in the inner end of cylindrical portion 296, this recess serving to receive a compression spring 298, the opposite end of which engages the inner end 299 of the bore 293 which compression spring 298 serves to urge the plunger 294 radially outwardly of the label feeding drum 270. Inward and outward movement of the plunger 294 is limited by pin 300 fixed in the cylindrical portion 296 of the plunger 294 and received in a slot 301 in the lower portion of the label feeding drum 270. The length of slot 301 determines the inward and outward movement of plunger 294. The recess 297 in the cylindrical portion 296 is provided with an aperture 302 which communicates with an aperture 303 disposed directly above the arcuate grooves 288 and 289 in the valve plate 287. A bore 304 communicates with the recess 297 and a recess 305 in the outer side of the lower portion of plunger 294 and bore 304 also communicates with a bore 306 extending upwardly through the rectangular portion 295 of the plunger 294, bore 302 being closed at the upper end thereof by a plug 307. A recess 308 adjacent the upper end of rectangular portion 295 of plunger 294 is in communication with bore 306 through an aperture 309. Recesses 305 and 308 are closed by flaps 310 and 311, the outer walls of which are provided with apertures 312 and 313.

Shaft 265 rotates continuously during the operation of the machine but label feeding drum 270 only rotates during the actual operation of feeding and applying a label. The label feeding drum 270 is driven during a label feeding operation by a one-revolution clutch, one element of which is constituted by a toothed wheel 314 having teeth 315 on the periphery thereof, wheel 314 being fixed to the vertical shaft 265. Wheel 314 serves to cooperate with a pawl 316 pivotally mounted at 317 on a bracket 318 extending upwardly from the label feeding drum 270. The pawl 316 is provided with a bevel portion 319 which forms a single tooth designed to cooperate with the teeth 315 on the wheel 314. Pawl 316 is normally biased toward the wheel 314 by a compression spring 320 received in a recess 321 in the bracket 318, one end of the compression spring 320 engaging the end of the recess 321 and the opposite end engaging the pawl 316 below the pivot point 317.

Operation of the pawl 316 to cause engagement and disengagement thereof with the teeth 315 of wheel 314 is controlled by a solenoid 322 mounted on blocks 323 extending upwardly from the side bar 190. Solenoid 322 is provided with an armature 324 which is attached to a cross head 325 slidably mounted on guides 326. Cross head 325 is provided with a recess 327 in the under side thereof which serves to receive the enlarged end 328 of one arm 329 of a bell crank lever 330. Bell crank lever 330 is pivotally mounted at 331 on a pivot pin supported by a bracket 332 extending downwardly from the under side of side bar 190. The other arm 333 of bell crank lever 330 is provided on the lower side of the outer end thereof with a cam block 334 which may be secured to the arm 333 by screw threaded fastening means or the like 335. Cam block 334, as best shown in Fig. 21, is provided on the rear side thereof with an inclined cam portion 336 which terminates in a shoulder 337. Cross head 325 is normally urged toward the right as viewed in Figs. 18 and 20 by a compression spring 338 received on a rod 339 secured to the solenoid 332 and slidably positioned in a bore 340 in cross head 325. Energization of solenoid 322 serves to move the cross head 325 towards the left to the position shown in Fig. 18 with the cam block 334 raised above the upper end of pawl 316. De-energization of solenoid 322 results in movement of the cross head 325 to the position shown in Fig. 20 under the action of compression spring 338 and in this position the cam block 334 is disposed in the path of movement of the pawl 316 and upon rotation of the label feeding drum 270 the upper end of pawl 316 engages the cam surface 336 on cam block 334 which serves to disengage the pawl 316 from the teeth 315 on wheel 314, the pawl 316 coming to rest against shoulder 337 and preventing further rotation of label feeding drum 270 until the solenoid 322 is subsequently energized to raise the cam block 334 above the upper end of pawl 316 and permit this pawl to engage a tooth of wheel 314 under the action of compression spring 320. At this time label feeding drum 270 will commence to revolve due to the driving engagement between pawl 316 and wheel 314 which latter wheel is of course continuously rotating with shaft 265.

The operation of solenoid 322 is controlled by a microswitch 341 mounted on the apparatus as shown in Fig. 4, this switch 341 having a trigger 342 projecting into the path of movement of container 118 leaving the front and rear sealing rolls 54 and 89. The operation of switch 341 in connection with the label applying mechanism will be presently described.

Since it is necessary to heat the labels 255 prior to their initial application to the sealed end 119 of the container 118, heating means in the form of a shoe 343 is mounted on a bracket 344 by screw threaded fastening means or the like 345, bracket 344 in turn being supported on a block 346, the bracket 344 and block 346 being secured to rear bed plate 188 by screw threaded fastening means or the 347. Heating shoe 343 is provided with an arcuate surface 348 disposed adjacent the periphery of label feeding drum 270 and during feeding operation of such drum the label 255 is brought into close proximity 348 to heating shoe 343. The exact manner of operation during this heating and label applying step will be presently described. Shoe 343 may be provided with a heating element 349 disposed in a bore therein and the operation of this heating element 349 may be controlled by an adjustable thermostat 350 secured to the upper surface of the shoe 343. The temperature of shoe 343 may be indicated by a suitable thermometer 351 also secured to the upper surface of the shoe.

While electrical heating means for the shoe 343 has been shown and described for properly heating the labels 355 as they are fed toward the sealed ends 119 of container 118, it is to be understood that this heating means is shown and described for purposes of illustration only and other equivalent and suitable heating means may be employed. Such heating means may well take the form of a direct flame supplied by a gas jet or the like, which flame would impinge directly on the surface on the label 255, but due to the relatively rapid movement of the same would only provide sufficient heat to soften the plastic and would not result in raising the temperature a sufficient amount to cause burning of such labels. Such heating might also be accomplished by a suitable radiant heat source or by direct conduction contact with the label. It is not considered necessary to illustrate these alternative arrangements since obviously they might be applied by anyone skilled in the art.

The operation of the label feeding and applying mechanism is best shown in Figs. 22 to 25 inclusive. It is of course understood that a stack of labels 254 has been positioned in the magazine 242 and that these labels are urged against the end plate 246 by the follower 256 carried by plunger 257. It is also assumed that the vacuum pump 44 connected to the conduit 40 and the connection 290 communicating with the arcuate groove 288 in valve-plate 287 is operating and that the shoe 343 is heated to a suitable temperature.

A container 118 leaving the front and rear sealing rolls 54 and 89 with the sealed portion 119 of the container projecting above the inner runs 129 and 136 of the front and rear chains 122 and 123 will move toward trigger 342 of micro-switch 341 until the sealed end 119 of the container 118 contacts the trigger 342 at which time the solenoid 322 will be energized to move the cross head 325 toward the left as viewed in Fig. 18 and raise the cam block 334 out of engagement with the pawl 316. Compression spring 320 will thereupon urge the pawl 316 into engagement with a tooth 315 of the wheel 314 which operation will cause rotation of the label feeding drum 270.

It will be noted from an inspection of Fig. 22 that the caps 310 and 311 on the outer surface of the plunger 294 are in engagement with a label 255 and due to the vacuum created within the plunger 294 and applied to the surface of the label 255 through the apertures 312 and 313 in the caps 310 and 311 will result in inward movement of the plunger 294 against the action of compression spring 298 which will result in moving one end of the label 255 away from the stack 254 as clearly shown in Fig. 22. Upon rotation of the label feeding drum 270 to the position shown in Fig. 23 the label 255 will be withdrawn from the magazine 242 and such label will be positioned closely adjacent the arcuate surface 348 on the heating shoe 343. The trailing end portion of label 255 will actually be in contact with this arcuate surface 348 as clearly shown in Fig. 23. This contact and the juxtaposition of the label to this surface results in softening of the thermoplastic coating thereon or of the label as a whole if the same be made in its entirety of a thermoplastic.

Further rotation of label feeding drum 270 to the position shown in Fig. 24 results in application of the lower portion of the label to one side of the sealed portion 119 of the container 118 and as the label feeding drum 270 and the pressure roll 277 continues to rotate the label 255 is forced into intimate contact with one side of the sealed portion 119 resulting in tacking or sealing of the label 255 thereto.

Upon the label feeding drum 270 reaching the position shown in Fig. 25, the aperture 303 in the drum 270 will move out of communication with the arcuate groove 288 in the valve plate 287 and into communication with the arcuate groove 289 which is open to the atmosphere through aperture 291. This will result in outward movement of the plunger 294 and release of the label 255 from the caps 310 and 311 on the plunger 294 since air will be admitted to the space behind the plunger 294 and destroy the vacuum therein.

The label feeding drum 270 will continue to rotate until the caps 310 and 311 engage the end plate 246 of the magazine 242 at which time these caps and plunger 294 will be cammed inwardly with the caps 310 and 311 moving outwardly along the inclined surface 352 on the end plate 246 and into engagement with the foremost label in the stack 254. At this point the aperture 303 in the label feeding drum 270 will again register with the arcuate groove 288 in the valve plate 287 at which time vacuum will be reapplied resulting in movement of the end label 255 outwardly, and inward movement of the plunger 294, as clearly shown in Fig. 22.

As a result of the above described operations, one-half of the label will have been applied to the sealed portion 119 of the container 118 as clearly shown in Fig. 28. Obviously, as soon as the container 118 has moved a sufficient distance to become disengaged from the trigger 342 of micro-switch 341, the solenoid 322 will be de-energized resulting in movement of the cross head 325 toward the right as viewed in Fig. 18 to the position shown in Fig. 20 at which time the pawl 316 will upon sufficient rotation of label feeding drum 270 engage the cam surface 336 on cam block 334 to disengage the pawl 316 from the tooth 315 on wheel 314, and upon the pawl engaging shoulder 337 rotation of the label feeding drum 270 will cease. This is the position of the feeding drum shown in Fig. 22. The above described operation will be repeated as each sealed container passes from the front and rear sealing rolls 54 and 89 and into engagement with finger 342 of micro-switch 341.

Since the label 255 applied to the container 118 as shown in Fig. 28 must be folded to the position shown in Fig. 29, folding means for accomplishing this operation must be provided, and this folding means will now be described with particular reference to Figs. 4 and 30–33. Folding mechanism 353 may well comprise a base 354 having spaced parallel bores 355 and 356 slidably received on spaced parallel upstanding threaded studs 357 and 358. Studs 357 and 358 are secured to rear bed plate 188 by screw threaded fastening means or the like 359 and 360. Threadedly received on a stud 357 below one side of the base 354 is a nut 361 provided with a spur gear 362 on the periphery thereof. Also, threadedly received on the stud 358 below the opposite side of base 354 is a nut 363 having a spur gear 364 formed on the periphery thereof. Rotatably supported adjacent the midpoint of the base 354, by a stud 365 extending downwardly thereof, is an idler gear 366 which meshes with spur gears 362 and 364. Threadedly received on stud 357 above one side of the base 354 is a lock nut 367, and threadedly received on stud 358 above the opposite side of base 354 is a lock nut 368.

This structure serves to provide means for supporting and raising or lowering the folding mechanism 353 in accordance with the size of the containers 118 to which labels 255 are to be applied and obviously upon loosening of the lock nuts 357 and 358, and upon rotation of the idler gear 366 in either direction, the nuts 361 and 363 will be rotated to raise or lower the base 354 and the folding mechanism carried thereby, and upon adjustment of such base to the desired position, the same may be locked in place by tightening the lock nuts 367 and 368.

Base 354 of the folding mechanism 353 is provided with a downwardly inclined front face 369 and slidably secured in engagement with this base is a folder blade 370. As best shown in Fig. 31, folder blade 370 is provided with spaced downwardly inclined slots 372 and 373 which serve to receive studs 374 and 375, threadedly engaging the base 354 and supporting the blade 370 in position thereon. It will therefore be obvious that upon downward movement of the blade 370 the same will also move laterally or transversely of the apparatus and at the same time will move longitudinally thereof in the direction of travel of containers therethrough.

The blade 370 is normally held in raised or uppermost position by a tension spring 376 secured at 377 to the blade 370 and at 378 to a bracket 379 projecting upwardly from the upper surface of base 354. Downward movement of the folder blade 370 is provided by a solenoid 380 supported on a bracket 381 secured to the base 354. Solenoid 380 is provided with a plunger 382 which upon downward movement engages a leaf spring 383 secured by screw threaded fastening means or the like 384 to the upper surface of folder blade 370. Leaf spring 383 serves to absorb the shock occasioned by impingement of the plunger 382 therewith and permits relatively silent yet effective downward folding movement of the folder blade 370. Upward movement of the blade 370 upon deenergization of the solenoid 380 is caused by the tension spring 376. Adjacent the lower portion of the base 354 and directly below the folder blade 370 there is provided a backing bar 385 which may be conveniently secured to the base 354 by screw threaded fastening means or the like 386, and this fastening means may likewise serve to adjust the position of backing bar 385, when such is desirable.

Opposed to the backing bar 385 and below the folder blade 370 is an anvil 387, which is supported on a bracket 388. Bracket 388 is slidably received on threaded studs 389 in a manner similar to base 354, and a central stud 390 serves to rotatably support an idler gear 391 which meshes with gears 392 and 393 forming part of nuts threadedly received on the studs 389. Lock nuts 394 are also provided on the studs 389 above the frame 388, and upward and downward movement of the frame 388 and anvil 387 carried thereby is occasioned by manipulation of the idler gear 391, and locking of the same in adjusted position may be accomplished by the lock nuts 394 in the manner described above for the adjustment of base 354 carrying the folding mechanism. Operation of the solenoid 380 is controlled by a micro-switch 395 having a trigger 396 projecting into the path of movement of containers 118 having labels 255 applied thereto through the folding mechanism.

It is to be noted that the leading end 397 of the folder bar 370 is beveled and also that the lower edge of the folder bar 370 is provided with a recess 398 extending throughout the length thereof which forms an overhanging lip 399 which accomplishes the actual folding operation. As shown in Fig. 33, the overhanging lip 399 overlaps the anvil 387 when in downward folding position, resulting in proper folding of the label 255. The operation of the folding mechanism will now be described.

Upon leaving the label feeding drum 270 and pressure roll 277 where the label 255 is applied to the sealed portion 119 of the container 118, this assembly is carried by the front and rear feed chains 122 and 123 to the folding mechanism 353 at which time the label 255 and sealed portion 119 are carried between the backing bar 385 and the anvil 387. During this movement the label 255 contacts the beveled leading end 397 of the folder blade 370 and causes the label 255 to assume an inclined position as shown in Fig. 30. Movement of the label and container continues until the same contacts the trigger 396 of micro-switch 395 at which time the solenoid 380 is energized to move the folder blade 370 downwardly and forwardly. At this time the overhanging lip 399 engages the inclined label 255 as shown in Fig. 30 and folds such label over the anvil 387 as shown in Fig. 33.

Since the folder blade 370 by reason of the inclined slots 373 is moving downwardly and forwardly with the movement of the label 255 and container 118, there will be no relative movement between the folder blade 370 and the label 255. Consequently, no disfigurement of the label will be possible, and the same will be delivered to the final label sealing means without marks or other damage thereto and in a proper position to be heated and sealed to the container 118. When the label 255 and container 118 move out of contact with the trigger 396 of micro-switch 395, the solenoid 380 will be deenergized and the folder blade 370 will return to the uppermost position shown in Fig. 31 under the action of tension spring 376.

It is assumed, of course, that prior to the folding operation the base 354 and bracket 388 supporting anvil 387 will be adjusted to the proper height for the particular label and container being sealed, and such adjustment will remain constant until it is desired to change the size of label or container. The final label heating and sealing means will now be described.

Upon leaving the folding mechanism 353, the label is engaged by front and rear label holding and feeding chains 400 and 401. Chain 400 is trained around a sprocket 402 secured to the front label sealing roll 213 and rotating therewith and the chain 400 is also trained around a pulley 403 carried by a shaft 404 secured by screw threaded fastening means or the like 405 to the cross bar 192 and supported at its lower end on a bracket 406 carried by the front bedplate 187. The inner run 407 of label engaging chain 400 engages the label 255 at a point slightly below the fold therein. Chain 400 is maintained taut by an idler pulley 408 engaging the same and carried by a bracket 409, spring urged in a counter-clockwise direction as viewed in Fig. 4 and supported on bracket 406.

The rear label engaging chain 401 is trained around a sprocket 410 carried by the rear label feeding roll 200 and rotating therewith, and the opposite end of this chain 401 extends around a pulley 411 carried by a shaft 412 secured by screw threaded fastening means or the like 413 to the cross bar 192 and supported at its lower end on a bracket 414 carried by the rear bed plate 188. The inner run 415 of chain 401 engages the label 255 slightly below the fold therein and directly opposite the inner run 407 of chain 400 and chain 401 is maintained taut by a pulley 416 engaging the same and carried by a bracket 417 which is spring urged in a clockwise direction as viewed in Fig. 4 and carried by bracket 414. Since chains 400 and 401 move in synchronism with front and rear feed chains 122 and 123, obviously there will be no relative movement between either set of chains and the container or label, and consequently such container or label will not be disfigured in any way.

Front and rear label heater bars 418 and 419 are supported from brackets 420 and 421 respectively, depending from and secured to front and rear side bars 189 and 190 respectively by screw threaded fastening means of the like 422 and 423. Brackets 420 and 421 are provided at their upper ends with slots 424 and 425 which are engaged by the screw threaded fastening means 422 and 423 and permit inward and outward movement of the heater bars 418 and 419 in accordance with the thickness of the container and label being sealed.

Front heater bar 418 is provided with a bore 426 which serves to receive the heater element 427 and rear heater bar 419 is provided with a bore 428 which serves to receive a heater element 429. The operation of heater elements 427 and 429 may be controlled by a thermostat 430 mounted on the upper surface of either heater bar but shown on the upper surface of heater bar 419, thermostat 430 being controlled by a shaft 431 extending upwardly through the housing 241 and provided with a finger engaging knob 432, for convenient manipulation thereof.

Upon leaving the folding mechanism 353, the label 255 and container 118 are moved forward into engagement with the inner runs 407 and 415 of label engaging chains 400 and 401, at which time the label is firmly held in engagement with the sides of the sealed portion 119 of container 118 and the lower portion of the label is carried between the front and rear label heater bars 418 and 419. During the course of travel between these bars, the thermoplastic material of the label is heated to a sufficient temperature to soften the same and permit secure sealing thereof to the sealed portion 119 of the container 118. Upon leaving the heater bars 418 and 419 the label passes between the front and rear label sealing rolls 213 and 200 which engage the same and cause an intimate engagement between the surface of the label 255 and the sealed portion 119, resulting in a secure sealing engagement therewith, and since the sealing rolls 213 and 200 are smooth on the peripheries thereof, no disfigurement of the label is possible. The sealed container and label may then be removed from the apparatus by an operator or may be delivered to a conveyor for transportation to a suitable location.

It will be seen that by the above described invention there has been provided an efficient apparatus for suitably sealing containers and for feeding and applying labels to such containers without in any way disfiguring such label. As stated above, these labels may either be formed of a suitable thermoplastic or may have a thermoplastic coating thereon resulting in a secure attachment of the same to the sealed container. Appropriate adjustments are provided for accommodating containers of different size and thicknesses as well as labels of different size and thicknesses, and the speed of operation as well as the pressure utilized in the sealing operations may be varied to suit the particular conditions. The apparatus may be operated at a relatively rapid rate, and once adjusted requires no attention except for the feeding of containers thereto, maintaining a supply of labels in the magazine and removing the sealed and labeled containers therefrom.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. A sealing and label applying machine for thermoplastic containers comprising in combination a base, a main casting supported on said base, means for moving said main casting vertically to any desired position, spaced substantially parallel shafts rotatably mounted on said main casting, variable speed drive means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels of different size, a spring loaded follower for urging said stack toward one end of said magazine, a label feeding drum mounted for rotation about a vertical axis with the periphery thereof adjacent the end of said magazine and adjacent the inner runs of said feed chains, pressure roller resiliently mounted in opposition to said feeding drum, a plunger mounted for radial movement in said feeding drum, resilient means for urging said plunger outwardly, a passage in said plunger, caps on the outer surface of said plunger having apertures communicating with said passage, a valve plate disposed below said feeding drum and having an arcuate groove communicating with a source of vacuum and a second arcuate groove communicating with the atmosphere, an aperture in the lower surface of said feeding drum communicating with said passage and successively communicating with said grooves in said valve plate as said drum rotates, a one-revolution clutch for driving said drum, a solenoid for engaging and disengaging said clutch, a micro-switch having a trigger disposed in the path of movement of said containers delivered from said sealing rolls for energizing said solenoid upon engagement of a container with said trigger, a label heating shoe having a complementary arcuate surface disposed adjacent the periphery of said drum whereby said caps will engage the foremost label in said magazine and due to the application of a vacuum through said first groove to the passage in said plunger, said plunger will move inwardly to pull the foremost label away from said stack, and upon energization of said solenoid, said clutch will engage to rotate said drum and remove the label from said magazine, said label being heated by said shoe, and upon continued rotation of said drum, said heated label will engage said container and be firmly applied thereto by said pressure roll, said label being released by said caps and said plunger moving outwardly upon said aperture moving into communication with said second groove to break the vacuum, said clutch being released after one revolution with said caps engaging the next label in said stack, folding means for folding the applied label over the end of said container, label holding chains for engaging and holding said label in folded condition, elongated label heating bars and unheated label sealing rolls for pressing the heated label into firm engagement with said container to complete the sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

2. A sealing and label applying machine for thermoplastic containers comprising in combination a base, a main casting supported on said base, means for moving said main casting vertically to any desired position, spaced substantially parallel vertically disposed shafts rotatably mounted on said main casting, variable speed drive means for driving said shafts, front and rear sealing rolls fixed to said shaft, adjustable yieldable means biasing said front roll toward said rear roll, heating elements in said rolls, an adjustable thermostat for controlling said heating elements, front and rear feed chains having confronting inner runs for engaging and feeding containers between said feeding rolls, label feeding and applying mechanism comprising a magazine for accommodating a stack of labels of different size, a follower for urging said stack toward one end of said magazine, a label feeding drum mounted for rotation about a vertical axis and with the periphery thereof adjacent the end of said magazine and adjacent the inner runs of said feed chains, a pressure roller resiliently mounted in opposition to said feeding drum, a plunger mounted for radial movement in said feeding drum, resilient means for urging said plunger outwardly, a passage in said plunger, caps on the outer surface of said plunger having apertures communicating with said passage, a valve plate disposed below said feeding drum and having an arcuate groove communicating with a source of vacuum and a second arcuate groove communicating with the atmosphere, an aperture in the lower surface of said feeding drum communicating with said passage and successively communicating with said grooves in said valve plate as said drum rotates, a one-revolution clutch for driving said drum, a solenoid for engaging and disengaging such clutch, means disposed in the path of movement of said containers delivered from said sealing rolls for energizing said solenoid upon engagement of a container therewith, a label heating shoe having a complementary arcuate surface disposed adjacent the periphery of said drum whereby said caps will engage the foremost label in said magazine and due to the application of a vacuum through said first groove to the passage in said plunger, said plunger will move inwardly to pull the foremost label away from said stack and upon energization of said solenoid, said clutch will engage to rotate said drum and remove the label from said magazine, said label being heated by said shoe, and upon continued rotation of said drum said heated label will engage said container and be firmly applied thereto by said pressure roll, said label being released by said caps and said plunger moving outwardly upon said aperture moving into communication with said second groove to break the vacuum, said clutch being released after one revolution with said caps engaging the next label in said stack, folding means for folding the applied label over the end of said container, label holding chains for engaging and holding said label in folded condition, elongated label heating bars and unheated label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

3. A sealing and label applying machine for thermoplastic containers comprising in combination a base, a main casting supported on said base, means for moving said main casting vertically to any desired position, spaced substantially parallel vertically disposed shafts rotatably mounted on said main casting, variable speed drive means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said feeding rolls, label feeding and applying mechanism comprising a magazine for accommodating a stack of labels of different size, a follower for urging said stack toward one end of said magazine, a label feeding drum mounted for rotation about a vertical axis and with the periphery thereof adjacent the end of said magazine and adjacent the inner runs of said feed chains, a pressure roller resiliently mounted in opposition to said feeding drum, a plunger mounted for radial movement in said feeding drum, resilient means for urging said plunger outwardly, a passage in said plunger, caps on the outer surface of said plunger having apertures communicating with said passage, a valve plate disposed below said feeding drum and having an arcuate groove communicating with a source of vacuum and a second arcuate groove communicating with the atmosphere, an aperture in the lower surface of said feeding drum communicating with said passage and successively communicating with said grooves in said valve plated as said drum rotates, a one-revolution clutch for driving said drum, a solenoid for engaging and disengaging said clutch, means disposed in the path of movement of said containers delivered from said sealing rolls for engaging said solenoid upon engagement of a container therewith, label heating means disposed adjacent the periphery of said drum whereby said caps will engage the foremost label in said magazine and due to the application of a vacuum through said first groove to the passage in said plunger said plunger will move inwardly to pull the foremost label away from said stack and upon energization of said solenoid said clutch will engage to rotate such drum and remove the label from said magazine, said label being heated by said label heating means, and upon continued rotation of said drum said heated label will engage said container and be firmly applied thereto by said pressure roll, said label being released by said caps and said plunger moving outwardly upon said aperture moving into communication with said second groove to break the vacuum, said clutch being released after one revolution with said caps engaging the next label in said stack, folding means for folding the applied label over the end of said container, label holding chains for engaging and holding said label in folded condition, elongated label heating bars and unheated label sealing rolls for pressing the heated label into firm engagement with said container to complete sealing of the label thereto, said feed chains moving in synchronism with said container sealing rolls, said label feeding drum and said label sealing rolls and said label folding chains moving in synchronism with said feed chains and said label sealing rolls whereby relative movement between said container and label and said chains is prevented.

4. A sealing and label applying machine for thermoplastic containers comprising in combination a base, a main casting supported on said base, means for moving said main casting vertically to any desired position, spaced substantially parallel vertically disposed shafts rotatably mounted on said main casting, variable speed drive means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels of different size, a follower for urging said stack toward one end of said magazine, a label feeding drum mounted for rotation about a vertical axis and with the periphery thereof adjacent the end of said magazine and adjacent the inner runs of said feed chains, a pressure roller resiliently mounted in opposition to said feeding drum, a plunger mounted for radial movement in said feeding drum, resilient feeding means for urging said plunger outwardly, a passage in said plunger, caps on the outer surface of said plunger having apertures communicating with said passage, a valve plate disposed below said feeding drum and having an arcuate groove communicating with a source of vacuum and a second arcuate groove communicating with the atmosphere, an aperture in the lower surface of said feeding drum communicating with said passage and successively communicating with said grooves in said valve plate as said drum rotates, a one revolution clutch for driving said drum, means for engaging and disengaging said clutch, means disposed in the path of movement of said container delivered from said sealing rolls for controlling the operation of said clutch upon engagement of a container therewith, label heating means disposed adjacent the periphery of said drum whereby said caps will engage the foremost label in said magazine and due to the application of a vacuum through said first groove to the passage in said plunger said plunger will move inwardly to pull the foremost label away from said stack and upon engagement of said clutch said drum will rotate and remove the label from said magazine said label being heated by said label heating means, and upon continued rotation of said drum said heated label will engage said heated container and be firmly applied thereto by said pressure roll, said label being released by said caps and said plunger moving outwardly upon said aperture moving into communication with said second groove to break the vacuum, said clutch being released after one revolution with said caps engaging the next label in said stack, folding means for folding the applied label over the end of said container, label holding chains for engaging and holding said label in folded condition, elongated label heating bars and unheated label sealing rolls for pressing the heated label into firm engagement with said container to complete sealing of the label thereto, said feed chains moving in synchronism with said container sealing rolls, said label feeding drum and said label sealing rolls whereby relative movement between said container and label and said chains is prevented.

5. A sealing and label applying machine for thermoplastic containers comprising in combination a base, a main casting supported on said base, means for moving said main casting vertically to any desired position, spaced substantially parallel vertically disposed shafts rotatably mounted on said main casting, variable speed drive means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum mounted for rotation about a vertical axis, a pressure roller resiliently mounted in opposition to said feeding drum, a plunger mounted for radial movement in said feeding drum, resilient means for urging said plunger outwardly, a passage in said plunger, caps on the outer surface of said plunger having apertures communicating with said passage, a valve plate disposed below said feeding drum and having an arcuate groove communicating with a source of vacuum and a second arcuate groove communicating with the atmosphere, an aperture in the lower surface of said feeding drum communicating with said passage and successively communicating with said grooves in said valve plate as said drum rotates, a one-revolution clutch for driving said drum, means for engaging and disengaging said clutch, means disposed in the path of movement of said containers delivered from said sealing rolls for controlling the operation of said clutch upon engagement of a container therewith, label heating means disposed adjacent the periphery of said drum whereby said caps will engage the foremost label in said magazine and due to the application of a vacuum through said first groove to the passage in said plunger said plunger will move inwardly to pull the foremost label away from said stack and upon engagement of said clutch said drum will rotate and remove the label from said magazine, said label being heated by said label heating means and upon continued rotation of said drum said heated label will engage said container and be firmly applied thereto by said pressure roll said label being released by said cap and said plunger moving outwardly upon said aperture moving into communication with said second groove to break the vacuum, said clutch being released after one revolution with said caps engaging the next label in said stack, folding means for folding the applied label over the end of said container, label holding chains for engaging and holding said label in folded condition, elongated label heating bars and unheated label sealing rolls for pressing the heated label into final engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

6. A sealing and label applying machine for thermoplastic containers comprising in combination a base, a main casting supported on said base, means for moving said main casting vertically to any desired position, spaced substantially parallel vertically disposed shafts rotataby mounted on said main casting, variable speed drive means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted in opposition to said feeding drum, a plunger mounted for radial movement in said feeding drum, resilient means for urging said plunger outwardly, a passage in said plunger, caps on the outer surface of said plunger having apertures communicating with said passage, valve means for successively communicating said passage with a source of vacuum and with the atmosphere, a one-revolution clutch for driving said drum, means for engaging and disengaging said clutch, means disposed in the path of movement of said containers delivered from said sealing rolls for controlling the operation of said clutch upon engagement of a container therewith, label heating means disposed adjacent the periphery of said drum whereby said caps will engage the foremost label in such magazine and due to the application of a vacuum through said passage in said plunger said plunger will move inwardly to pull the foremost label away from said stack and upon engagement of said clutch said drum will rotate and remove the label from said magazine said label being heated by said label heating means, and upon continued rotation of said drum said heated label will engage said container and be firmly applied thereto by said pressure roll, said label being released by said caps and said plunger moving outwardly upon said passage being opened to the atmosphere to break the vacuum, said clutch being released after one revolution with said caps engaging the next label in said stack, folding means for folding the applied label over the end of said container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

7. A sealing and label applying machine for thermoplastic containers comprising in combination a base, a main casting supported on said base, means for moving said main casting vertically to any desired position, spaced substantially parallel vertically disposed shafts rotatably mounted on said main casting, variable speed drive means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted in opposition to said feeding drum, a plunger mounted for radial movement in said feeding drum, resilient means for urging said plunger outwardly, a passage in said plunger, caps on the outer surface of said plunger having apertures for communicating with said passage, means for successively communicating said passage with a source of vacuum and with the atmosphere, a clutch for driving said drum, means for engaging and disengaging said clutch, means disposed in the path of movement of said containers delivered from said sealing rolls for controlling the operation of said clutch upon engagement of a container therewith, label heating means disposed adjacent said drum whereby said caps will engage the foremost label in said magazine and due to the application of a vacuum through said passage in said plunger said plunger will move inwardly to pull the foremost label away from said stack, and upon engagement of said clutch said drum will rotate and remove the label from said magazine said label being heated by said label heating means, and upon continued rotation of said drum said heated label will engage said heated container and be firmly applied thereto by said pressure roll, said label being released by said caps and said plunger moving outwardly upon said passage being opened to the atmosphere to break the vacuum, said clutch being released after one revolution with said caps engaging the next label in said stack, folding means for folding the applied label over the end of said container, label holding means for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

8. A sealing and label applying machine for thermoplastic containers comprising in combination a base, a main casting supported on said base, means for moving said main casting vertically to any desired position, spaced substantially parallel vertically disposed shafts rotatably mounted on said main casting, variable speed drive means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted in opposition to said feeding drum, a plunger mounted for radial movement in said feeding drum, resilient means for urging said plunger outwardly, a passage in said plunger, caps on the outer surface of said plunger having apertures communicating with said passage, valve means for successively communicating said passage with a source of vacuum and with the atmosphere, a clutch for driving said drum, means for engaging and disengaging such clutch, label heating means disposed adjacent said drum whereby the caps will engage the foremost label in said magazine and due to the application of a vacuum through said passage in said plunger said plunger will move inwardly to pull the foremost label away from said stack and upon engagement of said clutch said drum will rotate and remove the label from said magazine, said label being heated by said label heating means and upon continued rotation of said drum said heated label will engage said heated container and be firmly applied thereto by said pressure roll said label being released by said caps and said plunger moving outwardly upon said passage being opened to the atmosphere to break the vacuum, said clutch being released after one revolution with said caps engaging the next label in said stack, folding means for folding the applied label over the end of the container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

9. A sealing and label applying machine for thermoplastic containers comprising in combination a base, a main casting supported on said base, means for moving said main casting vertically to any desired position, spaced substantially parallel vertically disposed shafts rotatably mounted on said main casting, variable speed drive means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted on opposition to said feeding drum, a plunger mounted for radial movement in said feeding drum, resilient means for urging said plunger outwardly, a passage in said plunger, label engaging surfaces on said plunger having apertures communicating with said passage, valve means for successively communicating said passage with a source of vacuum and with the atmosphere, a clutch for driving said drum, means for engaging and disengaging said clutch, label heating means disposed adjacent said drum whereby said surfaces will engage the foremost label in said magazine and due to the application of a vacuum through said passage in said plunger said plunger will move inwardly to pull the foremost label away from said stack and upon engagement of said clutch said drum will rotate and remove the label from said magazine said label being heated by said label heating means and upon continued rotation of said drum said heated label will engage said container and be firmly applied thereto by said pressure roll, said label being released by said surfaces and said plunger moving outwardly upon said passage being opened to the atmosphere to break the vacuum, said clutch being released after one revolution with said surfaces engaging the next label in said stack, folding means for folding the applied label over the end of said container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

10. A sealing and label applying machine for thermoplastic containers comprising in combination a base, a main casting supported on said base, spaced substantially parallel vertically disposed shafts rotatably mounted on said main casting, variable speed drive means for driving said shafts, front and rear sealing rolls fixed to said shafts, adjustable yieldable means biasing said front roll toward said rear roll, heating elements in said roll, an adjustable thermostat for controlling said heating elements, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted in opposition to said feeding drum, a plunger mounted for radial movement in said feeding drum, resilient means for urging said plunger outwardly, a passage in said plunger, label engaging surfaces on said plunger having apertures communicating with said passage, valve means for successively communicating said passage with a source of vacuum and with the atmosphere, a clutch for driving said drum, means for engaging and disengaging said clutch, label heating means disposed adjacent said drum whereby said surfaces will engage the foremost label in said magazine and due to the application of a vacuum through said passage in said plunger said plunger will move inwardly to pull the foremost label away from said stack and upon engagement of said clutch said drum will rotate and remove the label from said magazine said label being heated by said label heating means and upon continued rotation of said drum the heated label will engage such container and be firmly applied thereto by said pressure roll, said label being released by said surfaces and said plunger moving outwardly upon said passage being opened to the atmosphere to break the vacuum, said clutch being released after one revolution with said surfaces engaging the next label in said stack, folding means for folding the applied label over the end of said container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

11. A sealing and label applying machine for thermoplastic containers comprising in combination a base, a main casting supported on said base, spaced substantially parallel vertically disposed shafts rotatably mounted on said main casting, means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted in opposition to said feeding drum, a plunger mounted for radial movement in said feeding drum, resilient means for urging said plunger outwardly, a passage in said plunger, label engaging surfaces on said plunger having apertures communicating with said passage, valve means for successively communicating said passage, with a source of vacuum and with the atmosphere, a clutch for rotating said drum, means for engaging and disengaging said clutch, label heating means disposed adjacent said drum whereby said surfaces will engage the foremost label in said magazine, and due to the application of a vacuum through said passage in said plunger the plunger will move inwardly to pull the foremost label away from said stack, and upon engagement of said clutch the drum will rotate and remove the label from said magazine said label being heated by said label heating means, and upon continued rotation of said drum said heated label will engage said container and be firmly applied thereto by said pressure roll, said label being released by said surfaces and said plunger moving outwardly upon said passage being opened to the atmosphere to break the vacuum, said clutch being released after one revolution with said surfaces engaging the next label in said stack, folding means for folding the applied label over the end of said container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chain and said label sealing rolls whereby relative movement between said container and label and said chains is prevented.

12. A sealing and label applying machine for thermoplastic containers, comprising in combination a base, a main casting supported on said base, spaced substantially parallel shafts rotatably mounted on said main casting, means for driving said shafts, front and rear sealing rolls fixed to said shafts, adjustable yieldable means biasing said front roll toward said rear roll, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted in opposition to said feeding drum, a plunger mounted for radial movement in said feeding drum, resilient means for urging said plunger outwardly, a passage in said plunger, label engaging surfaces on said plunger having apertures communicating with said passage, valve means for successively communicating said passage with a source of vacuum and with the atmosphere, a clutch for driving said drum, means for engaging and disengaging said clutch, label heating means disposed adjacent said drum whereby said surfaces will engage the foremost label in said magazine and due to the application of a vacuum through said passage in said plunger said plunger will move inwardly to pull the foremost label away from said stack and upon engagement of said clutch, said drum will rotate and remove the label from said magazine, said label being heated by said label heating means and upon continued rotation of said drum said heated label will engage said container and be firmly applied thereto by said pressure roll, said label being released by said surfaces and said plunger moving outwardly upon said passage being opened to the atmosphere to break the vacuum said clutch being released after one revolution with said surfaces engaging the next label in said stack, folding means for folding the applied label over said container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

13. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, an adjustable thermostat for controlling said heating elements, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted in opposition to said feeding drum, a plunger mounted for radial movement in said feeding drum, resilient means for urging said plunger outwardly, a passage in said plunger, label engaging surfaces on said plunger having apertures communicating with said passage, valve means for successively communicating said passage with a source of vacuum and with the atmosphere, a clutch for driving said drum, means for engaging and disengaging said clutch, label heating means disposed adjacent said drum whereby said surfaces will engage the foremost label in said magazine and due to the application of a vacuum through said passage in said plunger said plunger will move inwardly to pull the foremost label away from said stack and upon engagement of said clutch said drum will rotate and remove the label from said magazine, said label being heated by said label heating means and upon continued rotation of said drum said heated label will engage said container and be firmly applied thereto by said pressure roll, said label being released by said surfaces and said plunger moving outwardly upon said passage being opened to the atmosphere to break the vacuum, said clutch being released after one revolution with said surfaces engaging the next label in said stack, folding means for folding the applied label over the end of the container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and said label and said chains is prevented.

14. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted in opposition to said feeding drum, a plunger mounted for radial movement in said feeding drum, resilient means for urging said plunger outwardly, a passage in said plunger, label engaging surfaces on said plunger having apertures communicating with said passage, valve means for successively communicating said passage with a source of vacuum and with the atmosphere, a clutch for driving said drum, means for engaging and disengaging said clutch, label heating means disposed adjacent said drum whereby said surfaces will engage the foremost label in said magazine and due to the application of a vacuum through said passage in said plunger said plunger will move inwardly to pull the foremost label away from said stack and upon engagement of said clutch said drum will rotate and remove the label from said magazine, said label being heated by said label heating means and upon continued rotation of said drum said heated label will engage said container and be firmly applied thereto by said pressure roll, said label being released by said surfaces and said plunger moving outwardly upon said passage being opened to the atmosphere to break the vacuum, said clutch being released after one revolution with said surfaces engaging the next label in said stack, folding means for folding the applied label over the end of said container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

15. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller resiliently mounted in opposition to said feeding drum, a plunger mounted for radial movement in said feeding drum, resilient means for urging said plunger outwardly, a passage in said plunger, label engaging surfaces on said plunger having apertures communicating with said passage, valve means for successively communicating said passage with a source of vacuum and with the atmosphere, a clutch for driving said drum, means for engaging and disengaging said clutch, label heating means disposed adjacent said drum whereby said surfaces will engage the foremost label in said magazine and due to the application of a vacuum through said passage in said plunger said plunger will move inwardly to pull the foremost label away from said stack and upon engagement of said clutch said drum will rotate and remove the label from said magazine, said label being heated by said label heating means and upon continued rotation of said drum said heated label will engage said container and be firmly applied thereto by said pressure roll, said label being released by said surfaces and said plunger moving outwardly upon said passage being opened to the atmosphere to break the vacuum, said clutch being released after one revolution with said surfaces engaging the next label in said stack, folding means for folding the applied label over the end of said container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

16. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism comprising a magazine for accommodating a stack of labels, a follower for urging said stack toward one end of said magazine, a label feeding drum, a pressure roller mounted in opposition to said feeding drum, means on said drum for engaging a label and removing the same from said magazine upon rotation of said drum, a clutch for driving said drum, means for engaging and disengaging said clutch, label heating means disposed adjacent said drum whereby upon engagement of said clutch said drum will rotate and remove the label from said magazine, said label being heated by said label heating means and upon continued rotation of said drum said heated label will engage said container and be firmly applied thereto by said pressure roll, said label being released by said label engaging means, said clutch being released after one revolution, folding means for folding the applied label over the end of said container, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding drum and said label sealing rolls and said label holding chains moving in synchronism with said feed chains and said label sealing rolls whereby relative movement between said container and label and said chains is prevented.

17. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism, folding means for folding the applied label over the end of said container comprising a base adjustably mounted for vertical movement to any desired position, a backing bar carried by said base, a folder bar slidably mounted on said base for simultaneous movement downwardly and forwardly in the direction of travel of said container and label, a lip on the lower edge of said folder bar for engaging said label, a beveled surface on the leading end of said folder bar for engaging and deflecting such label into an inclined position, an anvil opposed to said backing bar and carried by a bracket adjustably mounted for vertical movement to any desired position in accordance with the position of said base, a solenoid for moving said folder bar downwardly, a tension spring for returning said folder bar to uppermost position, a leaf spring for absorbing the shock of said solenoid, a micro-switch having a trigger disposed in the path of movement of said container and label for controlling said solenoid whereby upon movement of said container and label between said backing bar and said anvil and into contact with said trigger said solenoid will be energized to move said folder bar downwardly and in the direction of movement of said container and label with said lip engaging said label in overlapping relation to the upper edge of said anvil to fold such label without damage thereto, label holding chains for engaging and holding said label in folded condition, elongated label heating bars and label sealing rolls for pressing the heated label into firm engagement with said container to complete sealing of the label thereto, said feed chains moving in synchronism with said container rolls, said label feeding mechanism and said label sealing rolls and said label holding chains moving in synchronism with said feed chains and said label sealing rolls whereby relative movement between said container and label and said chains is prevented.

18. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism, folding means for folding the applied label over the end of said container comprising a base, a backing bar carried by said base, a folder bar slidably mounted on said base for simultaneous movement downwardly and forwardly in the direction of travel of said container and label, a lip on the lower edge of said folder bar for engaging said label, a beveled surface on the leading end of said folder bar for engaging and deflecting said label into an inclined position, an anvil opposed to said backing bar and carried by a bracket, a solenoid for moving said folder bar downwardly, a tension spring for returning said folder bar to uppermost position, a leaf spring for absorbing the shock of said solenoid, a micro-switch having a trigger disposed in the path of movement of said container and label for controlling said solenoid whereby upon movement of said container and label between said backing bar and said anvil and into contact with said trigger said solenoid will be energized to move said folder bar downwardly and in the direction of movement of said container and label with said lip engaging said label in overlapping relation to the upper edge of said anvil to fold said label without damage thereto, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding mechanism and said label sealing rolls and said label holding chains moving in synchronism with said feed chains and said label sealing rolls whereby relative movement between said container and label and said chains is prevented.

19. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism, folding means for folding the applied label over the end of said container comprising a base, a backing bar carried by said base, a folder bar slidably mounted on said base for simultaneous movement downwardly and forwardly in the direction of travel of said container and label, a lip on the lower edge of said folder bar for engaging said label, a beveled surface on the leading end of said folder bar for engaging and deflecting said label into an inclined position, an anvil opposed to said backing bar, a solenoid for moving said folder bar downwardly, a tension spring for returning said folder bar to uppermost position, a micro-switch having a trigger disposed in the path of movement of said container and label for controlling said solenoid whereby upon movement of said container and label between said backing bar and said anvil and into contact with said trigger said solenoid will be energized to move said folder bar downwardly and in the direction of movement of said container and label with said lip engaging said label in overlapping relation to the upper edge of said anvil to fold said label without damage thereto, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding mechanism and said label sealing rolls and said label holding chains moving in synchronism with said feed chains and said label sealing rolls whereby relative movement between said container and label and said chains is prevented.

20. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism, folding means for folding the applied label over the end of said container comprising a base, a backing bar carried by said base, a folder bar slidably mounted on said base for simultaneous movement downwardly and forwardly in the direction of travel of said container and label, a lip on the lower edge of said folder bar for engaging said label, an anvil opposed to said backing bar, a solenoid for moving said folder bar downwardly, a tension spring for returning said folder bar to uppermost position, a micro-switch having a trigger disposed in the path of movement of said container and label for controlling said solenoid whereby upon movement of said container and label between said backing bar and said anvil and into contact with said trigger said solenoid will be energized to move said folder bar downwardly and in the direction of movement of said container and label with said lip engaging said label in overlapping relation to the upper edge of said anvil to fold said label without damage thereto, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding mechanism and said label sealing rolls and said label holding chains moving in synchronism with said feed chains and said label sealing rolls whereby relative movement between said container and label and said chains is prevented.

21. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism, folding means for folding the applied label over the end of said container comprising a base, a backing bar carried by said base, a folder bar slidably mounted on said base for simultaneous movement, downwardly and forwardly in the direction of travel of said container and label, a lip on the lower edge of said folder bar for engaging said label, an anvil opposed to said backing bar, means for returning said folder bar to uppermost position, a micro-switch having a trigger disposed in the path of movement of said container and label for controlling said solenoid whereby upon movement of said container and label between said backing bar and said anvil and into contact with said trigger said solenoid will be energized to move said solenoid downwardly and in the direction of movement of said container and label with said lip engaging said label in overlapping relation to the upper edge of said anvil to fold said label without damage thereto, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding mechanism and label sealing rolls and said label holding chains moving in synchronism with said feed chain and said label sealing rolls whereby relative movement between said container and label and said chains is prevented.

22. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying machinsm, folding means for folding the applied label over the end of said container comprising a base, a backing bar carried by said base, a folder bar slidably mounted on said base for simultaneous movement downward and forwardly in the direction of travel of said container and label, a lip on the lower edge of said folder bar for engaging said label, an anvil opposed to said backing bar, a solenoid for moving said folder bar downwardly, means for returning said folder bar to uppermost position, control means for said solenoid disposed in the path of movement of said container and label for controlling said solenoid whereby upon movement of said container and label between said backing bar and said anvil and into contact with said control means said solenoid will be energized to move said folder bar downwardly and the direction of movement of said container and label with said lip engaging said label in overlapping relation to the upper edge of said anvil to fold said label without damage thereto, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding mechanism and said label sealing rolls and said label holding chains moving in synchronism with said feed chains and said label sealing rolls whereby relative movement between said container and label and said chains is prevented.

23. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism, folding means for folding the applied label over the end of said container comprising a base, a backing bar carried by said base, a folder bar slidably mounted on said base for simultaneous movement downwardly and forwardly in the direction of travel of said container and label, a lip on the lower edge of said folder bar for engaging said label, an anvil opposed to said backing bar, means for moving said folder bar downwardly, means for returning said folder bar to uppermost position, control means for said folder bar moving means disposed in the path of movement of said container and label whereby upon movement of said container between said backing bar and said anvil and into contact with said control means said folder bar will move downwardly and in the direction of movement of said container and label with said lip engaging said label in overlapping relation to the upper edge of said anvil to fold said label without damage thereto, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding mechanism and said label sealing rolls and said label holding chains moving in synchronism with feed chains and said label sealing rolls whereby relative movement between said container and label and said chains is prevented.

24. A sealing and label applying machine for thermoplastic containers comprising in combination a base, a main casting supported on said base, spaced substantially parallel shafts rotatably mounted on said main casting, means for driving said shaft, front and rear sealing rolls fixed to said shaft, heating elements in said rolls, front and rear feed chains having confronting inner runs for engaging and feeding containers between said sealing rolls, label feeding and applying mechanism, folding means for folding the applied label over the end of said container comprising a base, a folder bar slidably mounted on said base for simultaneous movement downwardly and forwardly in the direction of travel of said container and label, a lip on the lower edge of said folder bar for engaging said label, an anvil opposed to said base, means for moving said folder bar downwardly, means for returning said folder bar to uppermost position, control means for said folder bar moving means whereby upon movement of said container and label between said base and said anvil said folder bar will move downwardly and in the direction of movement of said container and label with said lip engaging said label in overlapping relation to the upper edge of said anvil to fold said label without damage thereto, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding mechanism and said label sealing rolls and said label holding chains moving in synchronism with said feed chains and said label sealing rolls whereby relative movement between said container and said label and said chains is prevented.

25. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism, folding means for folding the applied label over the end of said container comprising a base, a folder bar slidably mounted on said base for simultaneous movement downwardly and forwardly in the direction of travel of said container and label, a lip on the lower edge of said folder bar for engaging said label, an anvil opposed to said base, means for moving said folder bar downwardly, means for returning said folder bar to uppermost position, control means for said folder bar moving means disposed in the path of movement of said container and label whereby upon movement of said container and label between said base and said anvil and into contact with said control means said folder bar will move downwardly and in the direction of movement of said container and label with said lip engaging said label in overlapping relation to the upper edge of said anvil to fold said label without damage thereto, label holding chains for engaging and holding said label in folded condition, elongated label heating bars and label sealing rolls for pressing the heated label into firm engagement with said container to complete sealing of the label thereto, said feed chains moving in synchronism with said container sealing rolls, said label feeding mechanism and said label sealing rolls and said label holding chains moving in synchronism with said feed chains and said label sealing rolls whereby relative movement between said container and label and said chains is prevented.

26. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism, folding means for folding the applied label over the end of said container, front and rear label holding chains having confronting inner runs for engaging and holding said label in folded condition, elongated label heating bars adjustably supported for movement toward and from each other and label sealing rolls for pressing the heated label into firm engagement with said container to complete sealing of the label thereto, said feed chains moving in synchronism with said container sealing rolls, said label feeding mechanism and said label sealing rolls and said label holding chains moving in synchronism with said feed chains and said sealing rolls whereby relative movement between said container and label and said chains is prevented.

27. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said feeding rolls, label feeding and applying mechanism, folding means for folding the applied label over the end of said container, front and rear label holding chains having confronting inner runs for engaging and holding said label in folded condition, elongated label heating bars and label sealing rolls for pressing the heated label into firm engagement with said container to complete sealing of the label thereto, said feed chains moving in synchronism with said container sealing rolls, said label feeding mechanism and said label sealing rolls and said label holding chains moving in synchronism with said feed chains and said label sealing rolls whereby relative movement between said container and label and said chains is prevented.

28. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear feed chains having confronting inner runs for engaging and feeding containers between said sealing rolls, label feeding and applying mechanism, folding means for folding the applied label over the end of said container, front and rear label holding chains for engaging and holding said label in folded condition, elongated label heating bars and label sealing rolls for pressing the heated label into firm engagement with said container to compete sealing of the label thereto, said feed chains moving in synchronism with said container sealing rolls, said label feeding mechanism and said label sealing rolls and said label holding chains moving in synchronism with said feed chains and said label sealing rolls whereby relative movement between said container and label and said chains is prevented.

29. A sealing and label applying machine for thermoplastic containers comprising in combination a base, a main casting supported on said base, spaced substantially parallel shafts rotatably mounted on said main casting, means for driving said shafts, front and rear sealing rolls fixed to said shafts, heating elements in said rolls, front and rear flexible feed means having confronting inner runs for engaging and feeding containers between said sealing rolls, label feeding and applying mechanism, folding means for folding the applied label over the end of said container, front and rear flexible holding means for engaging and holding said label in folded condition, elongated label heating bars and label sealing rolls for pressing the heated label into firm engagement with said container to complete sealing of the label thereto, said feed means moving in synchronism with said container sealing rolls, said label feeding mechanism and said label sealing rolls and said label holding means moving in synchronism with said feed means and said label sealing rolls whereby relative movement between said container and label and said feeding and holding means is prevented.

30. In a sealing and label applying machine for thermoplastic containers, flexible conveying means having confronting runs for engaging and feeding containers through said machine, a label applying station positioned along the path of said containers, means spaced from said station for holding a stack of labels in feeding position including follower means for forcing the stack of labels toward one end of said label stack holding means, means for conveying a label from said label holding means to said label applying station including means for separating and removing a single label from said one end of said label stack holding means, means for heating the labels during their movement from said label stack holding means to said label applying station, means for aiding in pressing said labels on the end of the containers, folding means for folding the pressed labels over the end of said containers, flexible holding means for engaging and holding said labels in folded condition, means for further heating and pressing said labels into firm engagement with said containers to complete sealing the labels thereto, and mechanism for causing said label conveying means to operate only when a container is due to arrive at said label applying station.

31. In a sealing and label applying machine for thermoplastic containers, flexible conveying means having confronting runs for engaging and feeding containers through said machine, a label applying station positioned along the path of said containers, means spaced from said station for holding a stack of labels in feeding position including follower means for forcing the stack of labels toward one end of said label stack holding means, means for conveying a label from said label holding means to said label applying station including means for separating and removing a single label from said one end of said label stack holding means, means for heating the labels during their movement from said label stack holding means to said label applying station, means for aiding in pressing said labels on the end of the containers, folding means for folding the pressed labels over the end of said containers, flexible holding means for engaging and holding said labels in folded condition, and means for further heating and pressing said labels into firm engagement with said containers to complete sealing the labels thereto.

References Cited in the file of this patent

UNITED STATES PATENTS

| | | |
|---|---|---|
| 1,746,697 | Eaglesfield | Feb. 11, 1930 |
| 1,889,193 | Craig | Nov. 29, 1932 |
| 2,070,685 | Rowe | Feb. 16, 1937 |
| 2,164,502 | Cundall et al. | July 4, 1939 |
| 2,166,761 | Kohl | July 18, 1939 |
| 2,293,687 | Allen | Aug. 18, 1942 |
| 2,387,446 | Herz | Oct. 23, 1945 |
| 2,525,341 | Von Hofe et al. | Oct. 10, 1950 |
| 2,571,103 | Belcher et al. | Oct. 16, 1951 |
| 2,578,329 | Von Hofe | Dec. 11, 1951 |
| 2,613,008 | Ouellette | Oct. 7, 1952 |
| 2,635,776 | Cook et al. | Apr. 21, 1953 |